United States Patent
De Frank et al.

(10) Patent No.: US 11,704,687 B1
(45) Date of Patent: Jul. 18, 2023

(54) MODIFICATION OF TRANSACTION FEES

(71) Applicant: Wells Fargo Bank, N.A., San Francisco, CA (US)

(72) Inventors: Joseph De Frank, San Francisco, CA (US); Darren M. Goetz, Salinas, CA (US); Michael Edwards McGee, San Francisco, CA (US); Dennis E. Montenegro, Concord, CA (US)

(73) Assignee: Wellls Fargo Bank, N.A., San Francisco, CA (US)

( * ) Notice: Subject to any disclaimer, the term of this patent is extended or adjusted under 35 U.S.C. 154(b) by 244 days.

(21) Appl. No.: 16/740,588

(22) Filed: Jan. 13, 2020

(51) Int. Cl.
  *G06Q 30/00* (2023.01)
  *G06Q 30/0207* (2023.01)
  *G07F 19/00* (2006.01)

(52) U.S. Cl.
  CPC ..... *G06Q 30/0237* (2013.01); *G06Q 30/0236* (2013.01); *G07F 19/206* (2013.01); *G07F 19/209* (2013.01)

(58) Field of Classification Search
  None
  See application file for complete search history.

(56) References Cited

U.S. PATENT DOCUMENTS

| | | | |
|---|---|---|---|
| 8,423,465 B1 * | 4/2013 | McGraw, IV | G07F 19/209 705/43 |
| 8,490,864 B2 | 7/2013 | Votaw et al. | |
| 9,135,788 B2 | 9/2015 | Graef et al. | |
| 9,342,963 B1 | 5/2016 | McGraw, IV et al. | |
| 9,355,530 B1 | 5/2016 | Block et al. | |
| 10,373,148 B1 | 8/2019 | Dixon et al. | |
| 2006/0282528 A1 * | 12/2006 | Madams | H04L 67/56 709/224 |
| 2007/0208618 A1 | 9/2007 | Paintin et al. | |
| 2009/0006183 A1 | 1/2009 | Paintin et al. | |
| 2009/0152354 A1 * | 6/2009 | Taylor | G06K 13/08 235/475 |
| 2011/0191243 A1 | 8/2011 | Allen | |

(Continued)

FOREIGN PATENT DOCUMENTS

| | | | |
|---|---|---|---|
| JP | H08221499 A | * | 8/1996 |
| KR | 101135695 B | | 4/2012 |

OTHER PUBLICATIONS

Yu, Roger, USA Today, You can now get money from a Wells Fargo ATM without using a debit card, https://www.usatoday.com/story/money/2017/03/29/wells-fargo-introduces-cardless-atms/99790102/, Mar. 29, 2017—One Time Access Code, 2 pages (Year: 2017).*

(Continued)

*Primary Examiner* — Michael W Schmucker
(74) *Attorney, Agent, or Firm* — Merchant & Gould P.C.

(57) ABSTRACT

A method implemented on an electronic computing device includes receiving a request for an automated teller machine (ATM) transaction from an ATM. Authentication credentials are received of a customer of the ATM. The authentication credentials are associated with the request for the ATM transaction. A notification is received of a failure to execute the ATM transaction at the ATM. In response to the receiving a notification of the failure, a fee modification is issued to the customer of the ATM. The fee modification permits modification of a transaction fee associated with a subsequent ATM transaction at an alternative ATM.

9 Claims, 12 Drawing Sheets

(56) References Cited

U.S. PATENT DOCUMENTS

| | | | |
|---|---|---|---|
| 2011/0313923 A1 | 12/2011 | Votaw et al. | |
| 2012/0303448 A1 | 11/2012 | Psillas et al. | |
| 2013/0085807 A1* | 4/2013 | Cincotta | G06Q 30/0203 |
| | | | 705/7.32 |
| 2016/0260068 A1 | 9/2016 | Dent | |
| 2017/0236107 A1 | 8/2017 | Arora | |
| 2020/0104814 A1 | 4/2020 | Gugsa | |

OTHER PUBLICATIONS

Hansell, Saul, "A Nation Challenged: The Banks; A Network of A.T.M.'s Out of Service in New York," https://www.nytimes.com/2001/09/19/business/a-nation-challenged-the-banks-a-network-of-atm-s-out-of-service-in-new-york.html, The New York Times, Sep. 19, 2001, 3 pages. (Year: 2001).*

Sydney Morning Herald, https://dialog.proquest.com/professional/docview/363696172/16C13F571A062DDE2BB/19?accountid=157282, Jun. 2000, 2 pages, Copyright 2019 ProQuest LLC.

Hansell, Saul, "A Nation Challenged: The Banks; A Network of A.T.M.'s Out of Service in New York," https://www.nytimes.com/2001/09/19/business/a-nation-challenged-the-banks-a-network-of-atm-s-out-of-service-in-new-york.html, The New York Times, Sep. 19, 2001, 3 pages.

Lussenhop, Jessica, "Wells Fargo ATM outage traps weekend fun money," http://www.citypages.com/news/wells-fargo-atm-outage-traps-weekend-fun-money-6533559, Apr. 4, 2011, 2 pages.

Associated Press, "Banks Extend Fee Waivers for Storm-Hit Customers," https://weather.com/news/news/sandy-bank-temporary-fees-20121105, Novembers, 2012, 10 pages.

Weiss, Todd R., "Citibank ATM outage leaves customers without service," https://www.computerworld.com/article/2583672/citibank-atm-outage-leaves-customers-without-service.html, Sep. 5, 2001, 4 pages.

Anonymous, "Irene's aftermath," The Patriot—News, https://dialog.proquest.com/professional/docview/886044546/16C140393DD6FB8CE2E/43?accountid=157282, Aug. 31, 2011, 2 pages.

Romansky, Jerry, "Options aboud to get around jammed ATM," https://dialog.proquest.com/professional/docview/1665049614/16C13F571A062DDE2BB/8?accountid=157282, Mar. 22, 2015, 2 pages.

Sedek, Zuhaila et al., "Unhappy over bank's extra charges," https://dialog.proquest.com/professional/docview/326390496/16C13F571A062DDE2BB/13?accountid=157282, Sep. 14, 2006, 2 pages.

Johnston, Jason et al., "The consumer financial protection bureau's arbitration study: a summary and critique," https://dialog.proquest.com/professional/docview/1797738944/16C13E68A0041E6C3A2/2?accountid=157282, Aspen Publishers, Inc. May 2016, 28 pages.

Depersio, Greg, "How Does ATM Fee Reimbursement Work?", https://www.investopedia.com/ask/answers/060616/how-atm-fee-reimbursement-works-ally-ever asp, Investopedia, Jul. 22, 2019, 9 pages.

Tierney, Kieran D. et al., "Brand meaning cocreation: toward a conceptualization and research implications," https://dialog.proquest.com/professional/docview/1835459324/16C13E68A0041E6C3A2/1?accountid=157282, emerald Publishing, Nov. 3, 2016, 11 pages.

Anonymous, "The price you pay for using the wrong ATM," Consumer Reports, https://dialog.proquest.com/professional/docview/217494454/16C13E68A0041E6C3A2/4?accountid=157282, Aug. 2006, 2 pages.

U.S. Appl. No. 16/740,732, filed Jan. 13, 2020.

* cited by examiner

1000

MODIFICATION OF TRANSACTION FEES

RELATED PATENT APPLICATIONS

This patent application is related to U.S. patent application Ser. No. 16/740,732, filed on even date herewith.

BACKGROUND

Financial organizations commonly do not charge fees to a customer when the customer transacts at an automated teller machine (ATM) that is in-network, i.e., at ATM locations supported or owned by the financial organizations. However, when an ATM transaction occurs at an out-of-network location, i.e., at a location that is not supported or owned by a financial organization, transaction fees are typically charged to the transacting customer. Such fees can include a fee for the owner or operator of the out-of-network ATM and/or a fee paid to the customer's financial organization for the use of the out-of-network ATM.

There may be various reasons that an in-network ATM is unavailable for a particular ATM transaction. The in-network ATM may be, for example, out of the particular desired item (e.g., cash) or otherwise out-of-service because of an error or malfunction. Or, an in-network ATM may simply not be available at a particular location. In such situations, a customer may need to use an alternative ATM that is out-of-network. The customer may then be charged one or more fees for using the out-of-network ATM.

SUMMARY

Embodiments of the disclosure are directed to a method implemented on an electronic computing device. The method comprises: receiving a request for an automated teller machine (ATM) transaction from an ATM; receiving authentication credentials of a customer of the ATM, wherein the authentication credentials are associated with the request for the ATM transaction; receiving a notification of a failure to execute the ATM transaction at the ATM; and in response to receiving the notification of the failure, issuing a fee modification to the customer of the ATM, wherein the fee modification permits modification of a transaction fee associated with a subsequent ATM transaction at an alternative ATM.

The details of one or more techniques are set forth in the accompanying drawings and the description below. Other features, objects, and advantages of these techniques will be apparent from the description, drawings, and claims.

DETAILED DESCRIPTION

Figure 1:
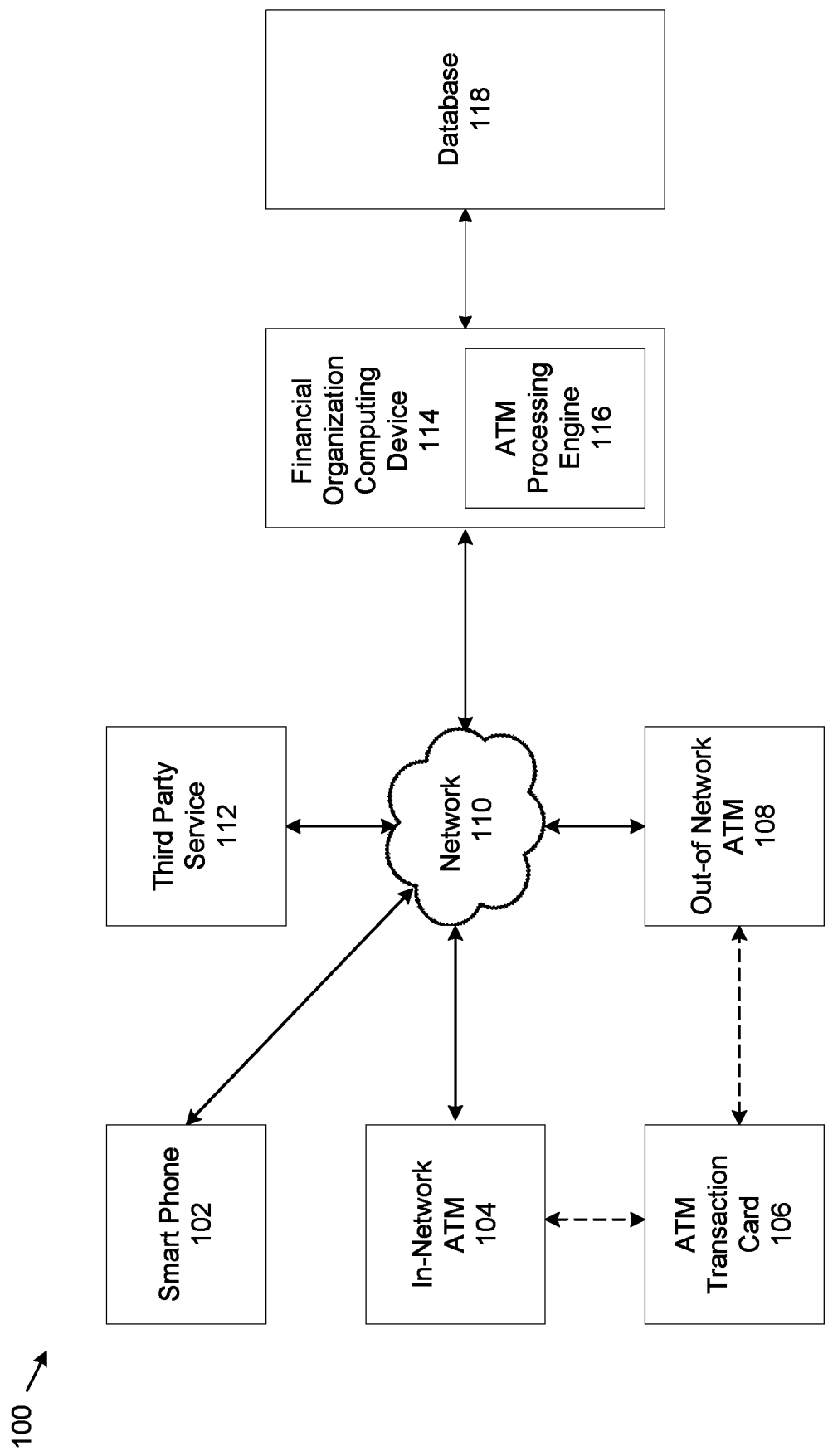
FIG. 1 shows an example system that supports modification of transaction fees.

The present disclosure is directed to systems and methods that modify transaction fees when using an automated teller machine (ATM) to conduct an ATM transaction. In one example implementation, a transaction card, such as an ATM transaction card, a credit card or a debit card, can be used at the ATM. In another implementation, an ATM code (e.g., a one-time access code) can be used at the ATM in lieu of the transaction card.

An ATM transaction can take various forms. In some examples, the ATM transaction can be a withdrawal of cash, where the ATM dispenses cash. In another example, the ATM transaction can include a deposit, where the ATM receives financial instruments like cash or checks. In other examples, the ATM transaction can include other transactions or actions, such as the ATM dispensing stamps, transferring funds between accounts, viewing account balances and the like.

Example circumstances that can result in modification (e.g., reduction, waiver, and/or credit) of transaction fees associated with an ATM transaction include various failures. Such failures include an ATM that runs out of cash, an ATM that has a mechanical malfunction, such as a mechanical inability to dispense cash, an ATM that is experiencing network errors, and a failure of equipment used to process the ATM transaction. Equipment used to process the ATM transaction can include the ATM, an electronic computing device, for example, a computing device of a financial organization that supports the ATM, and an electronic network that connects the ATM to the computing device. Other circumstances that can result in a modification of transaction fees include when a customer transacts in a geographical region that does not have an in-network ATM, increasing a likelihood that the customer must use an out-of-network ATM.

As used in this disclosure, an in-network ATM is one that does not charge the customer a transaction fee for conducting an ATM transaction. An in-network ATM is typically an ATM owned by or otherwise supported by (e.g., having an agreement with the ATM owner) the financial organization of the customer. Conversely, an out-of-network ATM is one that charges the customer one or more transaction fees for conducting an ATM transaction. Out-of-network ATMs are commonly referred to as foreign ATMs in the financial services industry.

As used in this disclosure, a fee modification is a modification to a transaction fee normally charged to a customer at an out-of-network ATM. The fee modification can comprise a waiver, wherein the transaction fee at the out-of-network ATM is completely waived, so that the transaction fee is not charged to the customer. The fee modification can also comprise a reduction, wherein the transaction fee at the out-of-network ATM is reduced. The fee modification can also comprise a reimbursement, wherein the transaction fee at the out-of-network ATM is later reimbursed.

In the examples provided herein, fee modification is described with respect to ATM transactions using ATM transaction cards. However, fee modification for other types of transactions is also possible, such as transactions involving credit and debit cards, as discussed later herein.

There are generally two mechanisms for implementing the fee modification. In a direct fee modification, the fee modification occurs at the time of the transaction so that only the modified fee (if any) is received from the customer. In an indirect fee modification, the transaction fee is received from the customer (e.g. as part of the underlying out-of-network ATM transaction) and later modified in the customer's financial account (e.g., through an account credit). Each type is described further below.

Referring to the direct fee modification, a voucher is typically issued. The voucher can be a physical voucher and/or an electronic voucher. An example physical voucher can be printed at the in-network ATM on, for example, ATM receipt paper. As described further below, the physical voucher can include details on how the voucher can be used for fee modification. These details can include at least a voucher number or code, which can be a unique numeric or alphanumeric string that is received from the customer to implement fee modification, as described below.

An electronic voucher can have a similar format. Specifically, the electronic voucher can include information on how to use the electronic voucher and a unique numeric or alphanumeric string that identifies the electronic voucher. The electronic voucher can be delivered various ways, such as through SMS, email, or mobile application.

An example voucher (physical and/or electronic) could include the following information.
Issued: Aug. 1, 2020 at 10:03 AM EDST at ATM 12345. We sincerely apologize for the inconvenience associated with the recent ATM failure. This voucher will allow you to use a nearby ATM of your choice without incurring additional fees. Simply access the alternative ATM within one hour and provide the following voucher number: 1234567890ABCD.

The details provided to the customer can also include other information, such as a location of alternative ATMs and directions thereto. In some implementations, the voucher can also include a map showing the alternate ATMs. This map can be displayed on the ATM and/or a computing device of the customer, such as the smartphone 102. The map can include distances to various alternative ATMs, along with instructions on use of those alternative ATMs. In some arrangements, the voucher can include information on how to redeem or use the voucher.

In addition to and/or in lieu of a physical voucher, the customer's financial account can be annotated with the voucher number. The voucher number can be provided to the customer when the customer logs into the customer's financial account. For instance, the voucher number can be provided in a mobile wallet of the customer. Upon access of the mobile wallet, the mobile wallet can provide the voucher number for use at an out-of-network ATM, as described further herein.

The in-network ATM can also provide other forms of an electronic voucher, such as a one-time passcode (OTP), which can be used to implement the fee modification. In some examples, the OTP is a specific type of electronic voucher that includes a numeric string that is delivered electronically to the customer. In some examples, the OTP can be four digits, although different types of OTPs can be provided.

In such an example, the OTP can be accepted in conjunction with and/or in lieu of a passcode or PIN that would normally be received by the out-of-network ATM as part of the ATM transaction. For example, when the customer uses the out-of-network ATM, the customer would insert or tap their transaction card (e.g. debit card) to the ATM, the customer would insert or tap their transaction card (e.g. debit card) to the ATM and enter the OTP instead of the customer's standard passcode during the authentication process. When the financial organization processes the out-of-network ATM transaction, the financial organization can detect that the customer has entered the OTP and can authenticate the customer based on the OTP. In another implementation using the OTP, when using the out-of-network ATM, the OTP can be received in conjunction with the normal ATM passcode (e.g., appended to the customer's original ATM passcode). The financial organization can authenticate the customer when the financial organization detects the OTP appended to the customer's passcode.

Other implementations of the direct fee modification are possible. For example, the OTP can be sent to the customer's smartphone. Alternately, a quick response (QR) code or a bar code can be sent to the customer's smartphone, or a payment token can be sent to a mobile wallet. The OTP, QR code, bar code on the customer's smartphone, or the payment token on the mobile wallet, can be used to facilitate a cash transaction and fee modification at an out-of-network ATM or a point of sale (POS) device, as discussed in more detail later herein. In one non-limiting example the OTP, QR code, or bar code can be received the customer's smartphone via a short-range wireless communication.

In another implementation of the direct fee modification, when an in-network ATM is known to be non-operational, and a determination is made that the customer is in a vicinity of another ATM, the financial organization can proactively send a message to the customer to inform the customer that the in-network ATM is non-operational. The message can also include locations of nearby operational ATMs, and these locations can be displayed on the customer's smartphone. In addition, if there is no operational in-network ATM within a reasonable distance, for example 5 miles, the financial organization can provide an incentive to the customer to use an out-of-network ATM. The incentive can include a fee modification at the out-of-network ATM or some other incentive or reimbursement.

In another implementation of the direct fee modification, when a failure (e.g., a transaction failure) occurs at an in-network ATM, a printer on the in-network ATM at which the failure occurred can print out a list of ATMs near a location of the network ATM at which the failure occurred. The list of ATMs can include other in-network ATMs as well as out-of-network ATMs where a fee modification would potentially apply. The OTP can also be included on the printout.

In another implementation of the direct fee modification, when a failure (e.g., a transaction failure) occurs at an in-network ATM, transient data indicating that the failure occurred can be written onto the ATM transaction card. The transient data can be sent to the financial organization when an ATM transaction is made at an out-of-network ATM. The financial organization can use the transient data to implement a transaction fee modification.

In yet another implementation of the direct fee modification, a third party service, for example, an online payment service like Zelle® or Venmo®, can be used as a clearinghouse for vouchers. In this implementation, when the failure occurs at an in-network ATM, the financial organization associated with the ATM transaction card can be notified of the failure. The financial organization can then provide details of the fee modification to the third party service, such as a voucher number. Then, when the ATM transaction card is used at the out-of-network ATM, the third party service can be notified, and the voucher can be confirmed by the third party service for fee modification to occur.

In still yet another implementation of the direct fee modification, the voucher can be used at point of sales (POS) terminals at retail stores. For example, the financial organization may have an agreement with a retail store such as Starbucks to accept a voucher and dispense cash to the customer in lieu of the customer using an ATM. In this implementation, the retail store can use the voucher to be reimbursed for the cash.

In still yet another implementation of the direct fee modification, instead of a paper voucher, if the in-network ATM at which the failure occurs has a near-field communication (NFC) reader, the in-network ATM can use NFC to write transient data, consistent with a voucher, on a smartphone or smartwatch of the customer. This transient data may be stored in the mobile wallet application of the customer's device. The smartphone or smartwatch can then use the voucher at an out-of-network ATM or POS terminal that supports NFC to obtain cash with fee modification.

Referring to the indirect fee modification, when a failure occurs at an in-network ATM, the customer's financial account can be flagged to indicate that the failure occurred. Such flagging can take various forms and generally simply identifies the customer's financial account for fee modification. Such a flag can be metadata associated with the customer's financial account. Then, when an out-of-network ATM performs the ATM transaction, the financial organization can detect the flag associated with the customer's financial account and provide fee modification (e.g., a credit) to the customer's financial account.

In some implementations, when the financial organization associated with the in-network ATM has an agreement to waive transaction fees with a financial organization associated with the out-of-network ATM, the financial organization associated with the in-network ATM can request that the financial organization associated with the out-of-network ATM waive any transaction fees associated with the ATM transaction of the customer at the out-of-network ATM.

In some implementations, there can be one or more of a location, date, and time requirement for implementing the fee modification at the out-of-network ATM. For example, there can be a requirement that in order for the customer to obtain a fee modification, the ATM transaction at the out-of-network ATM needs to occur within a certain geographical range (e.g. within a set number of miles) of the in-network ATM at which the failure occurred, and/or within a certain date and time of the failure.

In some implementations, fee modification can be applicable to scenarios other than failures such as transaction failures. For instance, the customer can be in a geographical area in which there are not any in-network ATMs. In such a scenario, an out-of-network ATM can perform the ATM transaction. Under certain circumstances, fee modification (direct or indirect) can be provided for that ATM transaction. For example, the mobile application of the customer can provide a voucher so that direct fee modification can be provided at the out-of-network ATM. Alternatively, the financial organization can determine that no in-network ATM was available in a geographic area in which an ATM transaction is performed, and an indirect fee modification can be provided upon the out-of-network ATM performing the ATM transaction.

In some scenarios, fee modification can include a hybrid of both direct fee modification and indirect fee modification. For instance, the system can provide the customer with a voucher to allow for direct fee modification. However, the customer's financial account can also be flagged for indirect fee modification should the system detect that the customer be unable to or otherwise fail to use the voucher.

In some implementations, fee modification can be provided for other scenarios, such as for a credit card transaction or debit card transaction. For example, if the customer is using a credit card or debit card of the financial organization to make a transaction at a retail store, and the transaction is not completed because of an issue that occurs at the financial organization, the financial organization can provide a credit to the customer for the inconvenience of not being able to complete the financial transaction. In an example implementation, the inconvenience credit can be issued for high value customers, i.e., customers that do a high volume of business with the financial organization. An amount of the convenience credit can be proportional to a degree to which the customer is valued at the financial organization. As another example, a transaction fee can waived for a cash advance using a credit or debit card when a failure occurs at an in-network ATM.

The systems and methods disclosed herein are directed to a computing device technology that can solve a problem related to non-operational financial transaction processing equipment. As discussed, a specific problem can be an ATM that is out of cash or otherwise non-operational (completely or partially) or otherwise unavailable for the customer's transaction. The systems and methods can provide a solution to the problem by identifying a non-operational status of the transaction processing equipment and automatically providing an alternative ATM that can complete the desired transaction.

FIG. 1 shows an example system 100 that can support fee modification as a result of a failure to complete a financial transaction at an ATM. System 100 includes a smartphone 102, an in-network ATM 104, an ATM transaction card 106, an out-of-network ATM 108, a network 110, a third party service 112, a financial organization computing device 114, and a database 118. The financial organization computing device 114 includes an ATM processing engine 116. More, fewer, or different components are possible. The financial organization computing device 114 is associated with a financial organization (e.g. a bank) having a plurality of customers.

The example smartphone 102 is a smartphone typically owned or used by a customer of the financial organization. The smartphone 102 is an electronic computing device with both Internet and telephonic communication functionality. The smartphone 102 can include financial software applications, such as a software application for the financial organization and a mobile wallet application. The smartphone 102 also includes geolocation functionality (e.g. global positioning system (GPS) software) that can identify a geolocation for the smartphone 102.

ATM transactions executed by the customer at in-network ATM 104 are not charged transaction fees. The example ATM transaction card 106 is an ATM transaction card provided to the customer by the financial organization. The ATM transaction card 106 may be, for example, a debit card or a credit card. ATM transactions executed by the customer at an out-of-network ATM, such as out-of-network ATM 108, are typically charged one or more fees. For example, there can be a transaction fee charged to the customer by the financial organization for using the out-of-network ATM, and there can be another fee charged to the customer by an owner of the out-of-network ATM.

The ATM transaction card 106 can be used to obtain cash and make deposits at any ATM. In this example, the ATM transaction card 106 is a physical card that passes account information to an ATM when the ATM transaction card 106 is inserted into or passed close to (for a contact-less card) in-network ATM 104 and/or out-of-network ATM 108.

The example network 110 is a computing device network that may include the Internet, private networks, and a combination thereof. In some arrangements, the network 110 includes wired and/or wireless networks. The in-network ATM 104 and out-of-network ATM 108 can connect to the financial organization computing device 114 via network 110. In addition, one or more of smartphone 102 and third party service 112 can communicate with the financial organization computing device 114 using network 110.

The example third party service 112 is an optional third party entity that facilitates fee modification. In this example, third party service 112 is a peer-to-peer payment service that can be used on mobile devices as an alternate to cash and checks to transfer money between individuals. The money is electronically transferred from a financial account of one individual to a financial account of another individual. As discussed herein, third party service 112, such as Zelle® or Venmo®, can be used as a clearinghouse for vouchers.

The example financial organization computing device 114 is a computing device of the financial organization that supports an ATM network that includes in-network ATM 104. The customer who is assigned the ATM transaction card 106 may have one or more financial accounts at the financial organization. Such financial accounts can include, without limitation, a checking account, a savings account, a money market account, a credit card account, etc. Financial organization computing device 114 can comprise one or a plurality of computing devices. For instance, financial organization computing device 114 can actually be implemented in the cloud as a plurality of devices in a server farm.

Example ATM processing engine 116 processes ATM transactions executed at ATMs that are both in-network to the financial organization and out-of-network to the financial organization. The ATM processing engine 116 receives information regarding the ATM transactions, identifies an ATM for each transaction, authenticates the customer associated with an ATM transaction card used in an ATM transaction, and processes the ATM transaction. The ATM processing engine 116 determines when a failure (e.g., a transaction failure) occurs, and when the failure occurs, implements fee modification. In some arrangements, the in-network ATM 104 determines when an attempted transaction fails and can inform the ATM processing engine 116 of the failure via the network 110. The fee modification can include direct and/or indirect fee modification as described herein.

Example database 118 is a database associated with the financial organization of financial organization computing device 114. Database 118 can store information regarding customers of the financial organization, including ATM transaction card information, financial account information, and customer IDs and passwords associated with each ATM transaction card. Database 118 can also store information regarding all ATMs that are supported by the financial organization and that are considered in-network ATMs by the financial organization.

ATM information can include a geolocation for each ATM and records of ATM transactions executed at each ATM. Records of ATM transactions can include a status of each transaction, indicating whether the ATM transaction was completed successfully and, if there was a failure, indicating a reason for the failure. Database 118 can also store information regarding ATM transactions for each customer at a plurality of ATMs and a record of any fee modifications, including vouchers and OTPs issued to the customer because of failures.

The database 118 can be distributed over a plurality of databases. Financial organization computing device 114 can be programmed to query (e.g., using Structured Query Language (SQL)) database 118 to obtain ATM transaction information.

Figure 2:
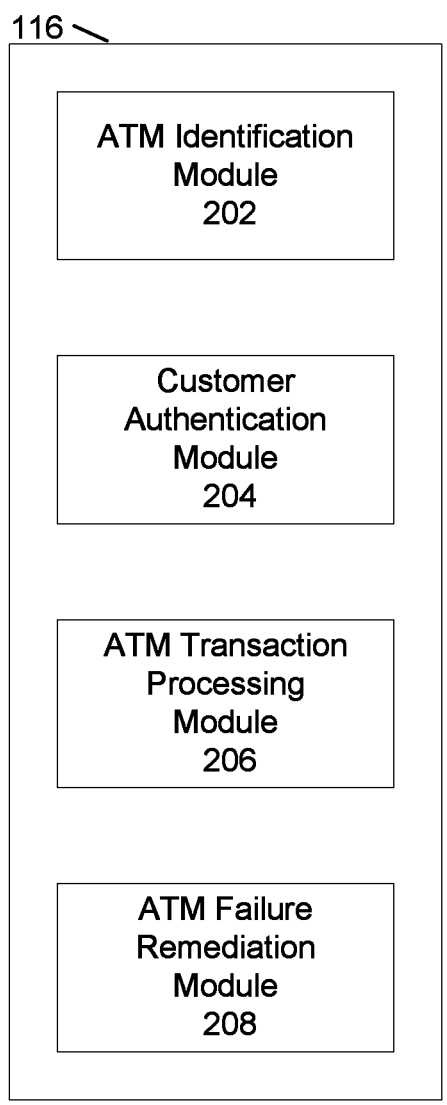
FIG. 2 show example modules of an ATM processing engine of a financial organization computing device of the system of FIG. 1.

FIG. 2 shows example modules of ATM processing engine 116. ATM processing engine 116 includes an ATM identification module 202, a customer authentication module 204, an ATM transaction processing module 206, and a failure remediation module 208. More, fewer, or different modules are possible.

The example ATM identification module 202 identifies an ATM associated with each ATM transaction. ATM identification information can be transmitted to financial organization computing device 114 and processed by ATM identification module 202, when an ATM transaction is initiated at an ATM. For example, when an ATM transaction is initiated at an ATM, such as in-network ATM 104 or out-of-network ATM 108, the ATM sends an identifier for the ATM to the financial organization computing device 114. ATM identification module 202 queries database 118 to authenticate the identifier and obtain ATM information for the ATM, including a geolocation for the ATM and whether the ATM is an in-network ATM.

The example customer authentication module 204 attempts to authenticate the customer when an ATM transaction is initiated at an ATM. When the ATM transaction is initiated, for example, by receiving the customer's ATM transaction card into the ATM, the ATM typically prompts the customer for a personal identification number (PIN) or password. When the PIN is received, the ATM sends the PIN to the financial organization computing device 114. The customer authentication module 204 then determines whether the PIN matches a PIN for the ATM transaction card in the ATM information previously entered by the customer. When the received PIN matches the password previously entered by the customer, the customer authentication module 204 authenticates the customer.

When the received PIN does not match the PIN previously entered by the customer, the customer authentication module 204 determines whether there has been a OTP issued for the ATM transaction card. When a determination is made that the OTP has been issued, the customer authentication module 204 determines whether the received PIN matches the OTP. When the received PIN matches the OTP, or matches the OTP appended to the previously entered PIN, the customer authentication module 204 authenticates the customer.

The example ATM transaction processing module 206 receives details of the ATM transaction initiated at the ATM and processes the ATM transaction. Processing the ATM transaction can include debiting a financial account of the customer for an amount of a cash request at the ATM and crediting the financial account of the customer for an amount of a deposit made at the ATM. The ATM transaction processing module 206 also determines whether there is a transaction fee associated with the ATM transaction and whether the transaction fee should be modified. As discussed earlier herein, the determination as to whether there is a transaction fee associated with the transaction is based on whether the ATM is an in-network ATM or an out-of-network ATM. The determination as to whether the transaction fee should be modified is based on factors such as whether there was a previous failure at an in-network ATM, a geographical location of the ATM, and other factors previously discussed herein.

The example failure remediation module 208 determines whether there has been a failure associated with the current ATM transaction, and determines what remedial action to take. As discussed earlier herein, the failure remediation module 208 can implement one of two types of fee modifications. In the direct fee modification scenario, the failure remediation module 208 provides a voucher (or OTP) to the ATM that can be provided to the customer. The voucher (or OTP) can then be accepted at an out-of-network ATM to modify any transaction fees incurred while using the out-of-network ATM. In the indirect fee modification scenario, the failure remediation module 208 flags the customer's financial account when a determination is made that a failure occurred during an ATM transaction. Then, when an out-of-network ATM completes the ATM transaction, transaction fees associated with the ATM transaction can be credited back to the financial account.

Figure 3:
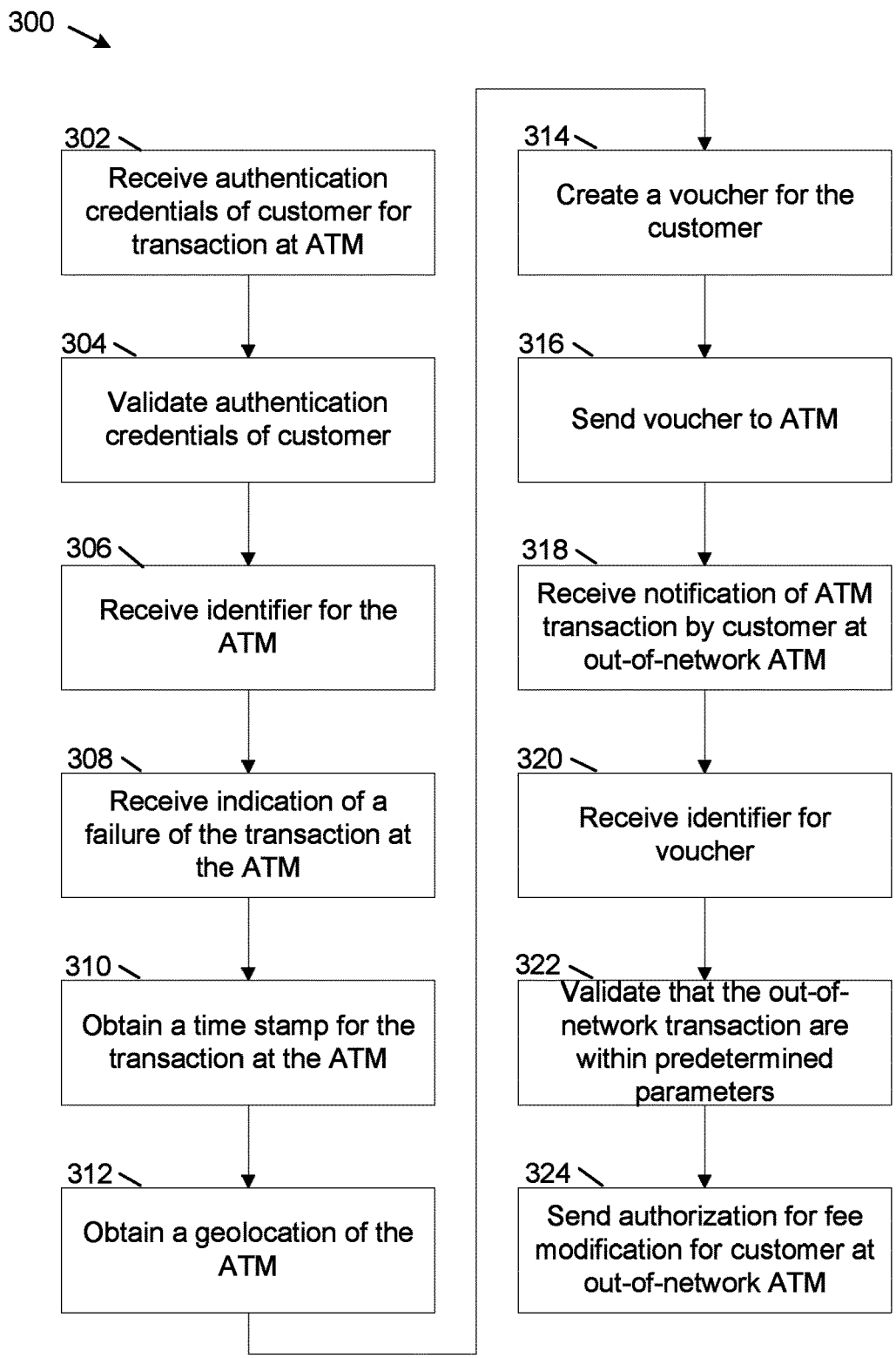
FIG. 3 shows an example method for providing a voucher for fee modification.

FIG. 3 shows a flowchart of an example method 300 for providing a voucher for a fee modification for a customer of a financial organization. The voucher is provided when a failure occurs at an in-network ATM of the financial organization. The voucher can be used by the customer to implement a fee modification at an out-of-network ATM that charges one or more transaction fees to the customer.

At operation 302, a computing device of the financial organization, in this example at the financial organization computing device 114, receives authentication credentials for the customer. The authentication credentials are received when an ATM transaction is initiated at an in-network ATM of the financial organization, in this example at in-network ATM 104. The ATM transaction is initiated when the customer's ATM transaction card, in this example ATM transaction card 106, is inserted into the in-network ATM 104. The authentication credentials comprise an identifier for the ATM transaction card 106 (e.g. a payment card number (PAN), and account number, a card token, or the like) and a PIN for the ATM transaction card 106. The identifier of the ATM transaction card 106 is sometimes contained within a magnetic stripe on the back of the ATM transaction card 106. In alternate arrangements, the identifier of the ATM transaction card 106 is contained in the memory of a card chip (e.g. EMV chip, wireless chip, etc.). In further arrangements, the identifier of the ATM transaction card 106 may be stored in a mobile wallet of the customer's smartphone and transmitted as part of a payment token. The identifier is read by the in-network ATM 104 when the ATM transaction card 106 is inserted into the in-network ATM 104. The PIN is one that has been previously established by the customer for the ATM transaction card 106. The in-network ATM 104 then transmits the received identifier and PIN to the financial organization computing device 114 for validation.

At operation 304, the financial organization validates the authentication credentials of the customer. Validation comprises verifying that the PIN entered corresponds to PIN previously established by the customer for the ATM transaction card 106. In some arrangements, validation includes verifying the status of the account associated with the ATM transaction card 106. In arrangements where the identifier is packaged as a token received from a mobile wallet, the validation may also include detokenizing the token to obtain the underlying account number.

At operation 306, the financial organization computing device 114 receives an identifier for the in-network ATM 104. The identifier is typically an alphanumeric number (e.g. a serial number, device number, etc.) that uniquely identifies the in-network ATM 104. The identifier can be used by the financial organization to update transaction statistics for the in-network ATM 104, obtain geolocation information for the in-network ATM 104, and update operational status for the in-network ATM 104. In some implementation, the identifier for the in-network ATM 104 is sent to the financial organization computing device 114 at the same time as the authentication credentials are sent. In other implementations, the identifier for the in-network ATM 104 is sent to the financial organization computing device 114 before the authentication credentials are sent to the financial organization computing device 114.

At operation 308, the financial organization computing device 114 receives an indication of a failure (e.g., a transaction failure) at the in-network ATM 104. The indication of the failure can be received because of a transaction status message that is sent from the in-network ATM 104. The status message can include a header (e.g., status message header) and an identifier for the ATM 104, such as a unique alphanumeric string (e.g., ATM identifier) that identifies the ATM 104. The status message can also indicate the cause of the failure (e.g., a failure type indicator), such as the in-network ATM 104 being out of cash, a mechanical failure at the in-network ATM 104, or some other cause of the failure.

At operation 310, the financial organization computing device 114 receives a time-stamp (e.g., time of failure) for the failure at the in-network ATM 104. The timestamp indicates a date and time of day of the failure. In some implementations, the timestamp is received at the same time at the indication of the failure.

At operation 312, the financial organization computing device 114 optionally receives (e.g., location of ATM) or otherwise obtains a geolocation for the in-network ATM 104. The geolocation can be obtained from a database, for example database 118, by looking up the in-network ATM 104 in the database 118 with the received identifier for the in-network ATM 104.

For instance, an example schema for a status message from the in-network ATM 104 to the financial organization computing device 114 can include the following.

| Status message header | ATM Identifier | Failure type indicator | Time of failure | Location of ATM |
|---|---|---|---|---|

At operation 314, the financial organization computing device 114 creates a voucher for the customer that is using the in-network ATM 104. The voucher can be used by the customer to obtain a fee modification for any transaction fees charged to the customer at an out-of-network ATM, for example at out-of-network ATM 108, when an ATM transaction is made at the out-of-network ATM 108. For instance, the voucher can have a bar code or quick response (QR) code imprinted on the voucher, and/or the voucher can have a unique identification number imprinted on the voucher. For organizations associated with out-of-network ATMs that have an agreement to permit forgiveness of transaction fees with the financial organization, and have and adapted their out-of-network ATMs to accept the voucher, the transaction fee can be waived at the out-of-network ATM before it is charged to the customer. For out-of-network ATMs that have not been adapted to accept the voucher, the customer can use the voucher to be reimbursed for any transaction fees charged when using out-of-network ATM 108. For example, the voucher can be used at a branch office, for example a local bank, of the financial organization, or the voucher can be used via a software application for the financial organization that can be installed on the smartphone 102.

The voucher can also have certain validation parameters associated with it. For example, there can be a requirement associated with the voucher that the voucher be used within a certain date and time of the failure, and/or a requirement that the voucher be used at an out-of-network ATM that has a geolocation within a certain distance of a geolocation of the in-network ATM 104.

At operation 316, the financial organization computing device 114 electronically sends the voucher to the in-network ATM 104. For instance, an example schema for the voucher to be communicated from the financial organization computing device 114 to the in-network ATM 104 to can include the following.

| Voucher ID | Voucher Number | Voucher Instructions |

The in-network ATM 104 can print the voucher for the customer. In a situation where there is a known mechanical failure at the in-network ATM 104, the voucher can be electronically sent to a mobile device of the customer, in this example smartphone 102. In some implementations, the financial organization can link the voucher to a financial account of the customer at the financial organization, and the voucher can be presented to the customer when the customer logs into the customer's financial account.

At operation 318, the financial organization computing device 114 receives a notification of an ATM transaction using the ATM transaction card 106 at the out-of-network ATM 108. For example, a computing device associated with the out-of-network ATM can send to the financial organization computing device 114 authentication credentials entered by the customer at the out-of-network ATM 108. For example, an identifier for the ATM transaction card 106 and the customer's PIN can be sent to the financial organization computing device 114 so that the financial organization computing device 114 can authenticate the customer.

At operation 320, the financial organization computing device 114 receives an identifier for the voucher and the financial organization validates the identifier on the voucher. For example, when a financial organization associated with the out-of-network ATM 108 has an agreement with the financial organization associated with the in-network ATM 104, the out-of-network ATM 108 can prompt the customer to enter a voucher number (e.g. by entering the number as the pin, by scanning the code at a scanner, by inserting the paper voucher into the check deposit mechanism where the code is read from the paper voucher, by tapping the customer's mobile wallet at the mobile wallet reader of the out-of-network ATM 108, etc.). When the out-of-network ATM 108 receives the voucher number, the financial organization computing device associated with the out-of-network ATM 108 can send the voucher number to the financial organization computing device 114 so that the financial organization computing device 114 can validate the voucher.

At operation 322, the financial organization computing device 114 validates that the ATM transaction at the out-of-network ATM 108 is within the date, time, and geolocation parameters specified in the voucher. For instance, the financial organization computing device 114 may validate the voucher by referencing information in database 118 using one or more database management system processes. Examples of validation processes may include range and constraint checks, data-type checks, and structured checks, to name a few possible examples.

At operation 324, when a determination is made that the voucher is valid and that the ATM transaction at the out-of-network ATM 108 is within the date, time, and geolocation parameters specified on the voucher, the financial organization computing device 114 sends an authorization for the fee modification to the financial organization computing device associated with the out-of-network ATM 108. In some arrangements, the authorization is sent directly to the out-of-network ATM 108. Accordingly, when the customer transacts at the out-of-network ATM 108 with a valid voucher, the financial organization associated with the out-of-network ATM 108 will waive any associated "non-member" ATM usage fees (e.g., $3) that may normally be charged to the customer.

Figure 4:
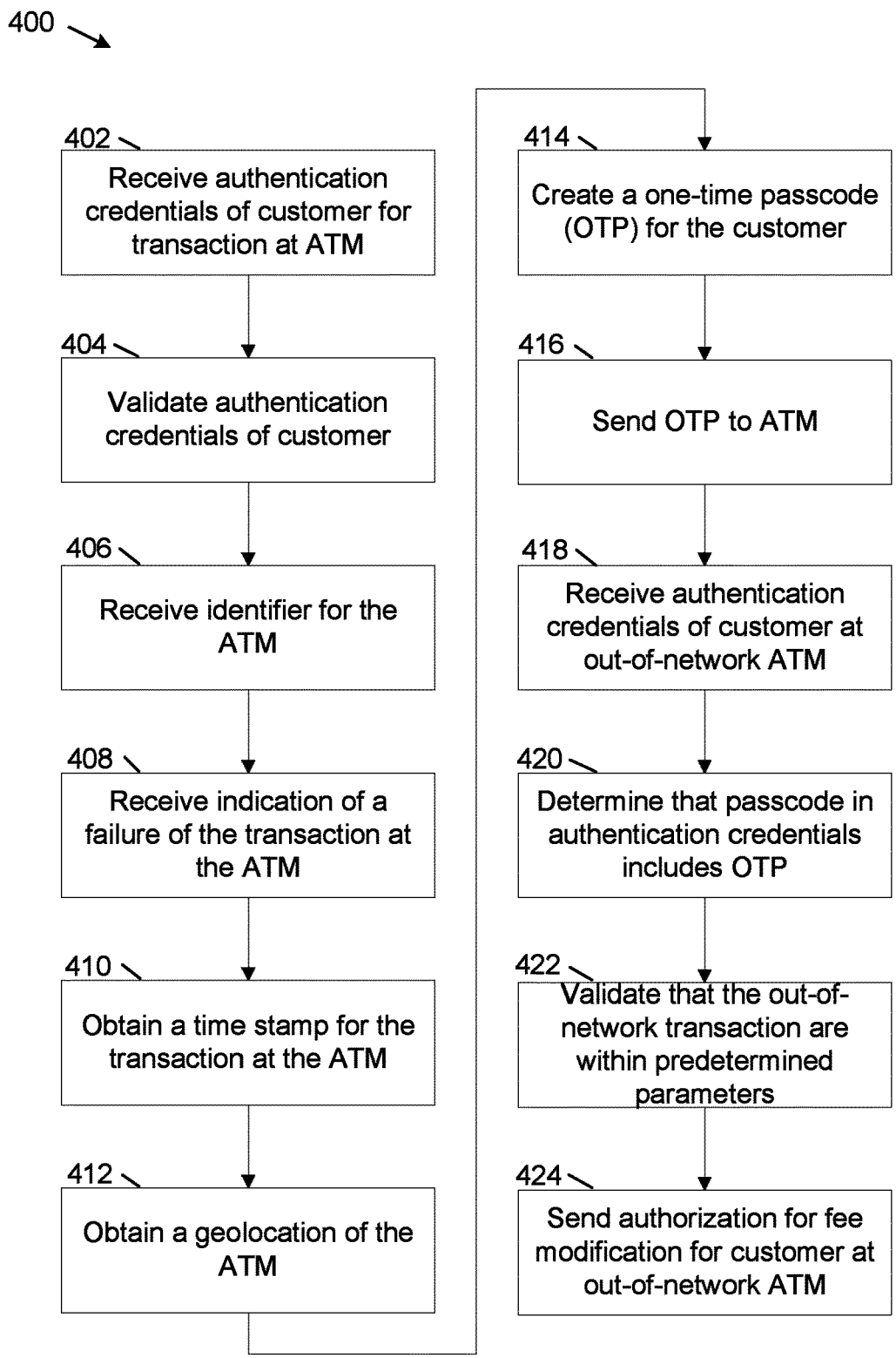
FIG. 4 shows an example method for providing a one-time passcode for fee modification.

FIG. 4 shows a flowchart of an example method 400 for providing a one-time passcode (OTP) that can be used to implement a fee modification for the customer of the financial organization. The OTP is provided when a failure occurs at an in-network ATM of the financial organization. The OTP can be used to implement the fee modification at an out-of-network ATM that charges one or more transaction fees to the customer.

At operation 402, the financial organization computing device 114 receives authentication credentials for the customer, similar to operation 302 of FIG. 3. The authentication credentials comprise the identifier for the ATM transaction card 106 (e.g. the payment card number (PAN), the account number, the card token, or the like) and the PIN for the ATM transaction card 106. The in-network ATM 104 then transmits the received identifier and PIN to the financial organization computing device 114 for validation.

At operation 404, the financial organization validates the authentication credentials of the customer. Validation comprises verifying that the PIN entered corresponds to PIN previously established by the customer for the ATM transaction card 106. In some arrangements, validation includes verifying the status of the account associated with the ATM transaction card 106. In arrangements where the identifier is packaged as a token received from a mobile wallet, the validation may also include detokenizing the token to obtain the underlying account number.

At operation 406, the financial organization computing device 114 receives an identifier for the in-network ATM 104. The identifier is typically an alphanumeric number (e.g. a serial number, device identifier, etc.) that uniquely identifies the in-network ATM 104, similar to operation 304 of FIG. 3.

At operation 408, the financial organization computing device 114 receives an indication of a failure at the in-network ATM 104. The indication of the failure can be received because of a transaction status message that is sent from the in-network ATM 104. The status message indicates that cause of the failure, such as the in-network ATM 104 being out of cash, a mechanical failure at the in-network ATM 104, or some other cause of the failure.

At operation 410, the financial organization computing device 114 receives a time-stamp for the failure at the in-network ATM 104. The timestamp indicates a date and time of day of the failure. In some implementations, the timestamp is received at the same time at the indication of the failure.

At operation 412, the financial organization computing device 114 obtains a geolocation for the in-network ATM 104. The geolocation can be obtained from a database, for example database 118, by looking up the in-network ATM 104 in the database 118 with the received identifier for the in-network ATM 104.

At operation 414, the financial organization computing device 114 creates an OTP for the customer. The OTP can comprise a numeric or alphanumeric identifier that can be used to identify the fee modification. As explained earlier herein, in one example implementation, the OTP can be received in lieu of the customer's ATM transaction card PIN when the ATM transaction card is received at an out-of-network ATM. In another example implementation, the OTP comprises the numeric or alphanumeric identifier that is received as appended to the customer's ATM transaction card PIN.

At operation 416, the OTP is sent to the in-network ATM 104. In-network ATM 104 can then print the OTP for the customer to take with him/her. Alternatively, if there is a known mechanical failure at the in-network ATM 104 that would prevent the OTP from being printed, or if the customer would prefer to receive the OTP electronically, the OTP can be delivered electronically (e.g., short message service (SMS), email, etc.) to the customer's smartphone, smartphone 102.

At operation 418, the financial organization computing device 114 receives authentication credentials for the customer at the out-of-network ATM 108. The authentication credentials include the OTP. For example, after the customer enters the authentication credentials at the out-of-network ATM 108, the computing device associated with the out-of-network ATM 108 sends the authentication credentials to the financial organization computing device 114 for validation. At operation 420, the financial organization computing device 114 determines that the authentication credentials include the OTP and validates the OTP.

At operation 422, the financial organization computing device 114 validates that the ATM transaction at the out-of-network ATM 108 is within the date, time, and geolocation parameters associated with the OTP.

At operation 424, when a determination is made that the OTP is validated and that the ATM transaction at the out-of-network ATM 108 is within the date, time, and geolocation parameters specified associated with the OTP, the financial organization computing device 114 sends an authorization for the fee modification to the financial organization computing device associated with the out-of-network ATM 108. For method 400, the financial organization associated with the out-of-network ATM 108 has an agreement with the financial organization associated with the in-network ATM 104 to implement the fee modification when authorized to do so by the financial organization computing device 114.

Figure 5:
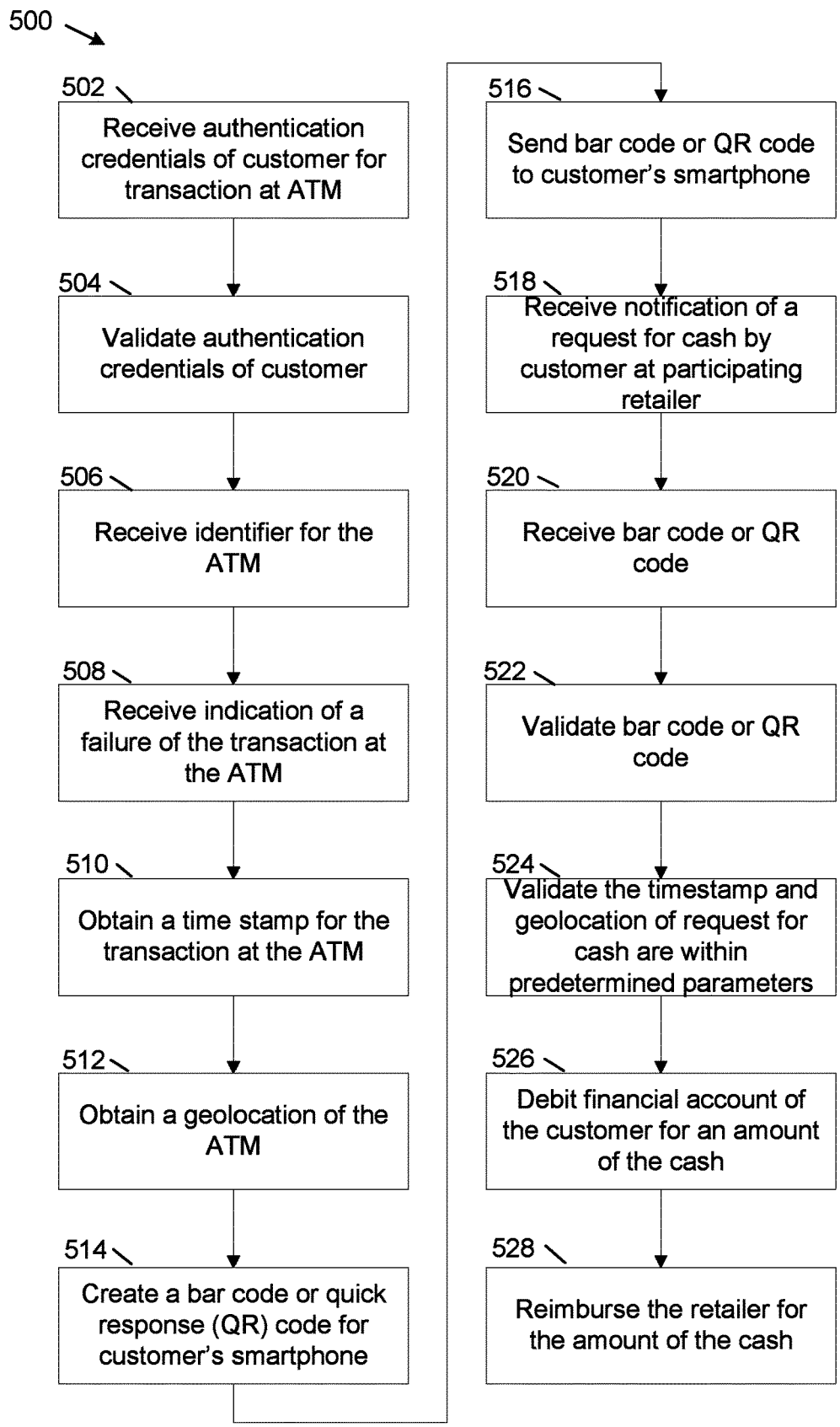
FIG. 5 shows an example method for providing a bar code or quick response code for fee modification.

FIG. 5 shows a flowchart of an example method 500 for providing cash to the customer at a participating retailer via the use of a bar code or QR code. The bar code or QR code is sent to the customer's smartphone, in this example smartphone 102, when a failure occurs at an in-network ATM of the financial organization. The bar code or QR code can be used at the participating retailer to obtain cash in lieu of locating another ATM at which to obtain the cash.

At operation 502, the financial organization computing device 114 receives authentication credentials for the customer, similar to operation 302 of FIG. 3. The authentication credentials comprise the identifier for the ATM transaction card 106 (e.g. a payment card number (PAN), an account number, a card token, or the like) and the PIN for the ATM transaction card 106. The in-network ATM 104 then transmits the received identifier and PIN to the financial organization computing device 114 for validation.

At operation 504, the financial organization validates the authentication credentials of the customer. Validation comprises verifying that the PIN entered corresponds to PIN previously established by the customer for the ATM transaction card 106. In some arrangements, validation includes verifying the status of the account associated with the ATM transaction card 106. In arrangements where the identifier is packaged as a token received from the mobile wallet, the validation may also include detokenizing the token to obtain the underlying account number.

At operation 506, the financial organization computing device 114 receives an identifier for the in-network ATM 104. The identifier is typically an alphanumeric number (e.g. a serial number, device identifier, etc.) that uniquely identifies the in-network ATM 104, similar to operation 304 of FIG. 3.

At operation 508, the financial organization computing device 114 receives an indication of a failure at the in-network ATM 104. The indication of the failure can be received as a result of a transaction status message that is sent from the in-network ATM 104. The status message indicates the cause of the failure, such as the in-network ATM 104 being out of cash, a mechanical failure at the in-network ATM 104, or some other cause of the failure.

At operation 510, the financial organization computing device 114 receives a time-stamp for the failure at the in-network ATM 104. The timestamp indicates a date and time of day of the failure. In some implementations, the timestamp is received at the same time at the indication of the failure.

At operation 512, the financial organization computing device 114 obtains a geolocation for the in-network ATM 104. The geolocation can be obtained from a database, for example database 118, by looking up the in-network ATM 104 in the database 118 with the received identifier for the in-network ATM 104.

At operation 514, the financial organization computing device 114 creates the bar code or QR code for the customer's smartphone 102. For instance, the financial organization computing device 114 may generate a machine-readable visual code according to one or more barcode formats and/or standards. That is, in some examples the financial organization computing device 114 is configured to encode voucher information or a voucher number within the visual code. For example, the barcode may be a single-dimensional or two-dimensional visual code. As discussed herein, the created bar code, QR code, or other type of visual code may be unique to the transaction fee modification granted to the customer. In the example described with reference to at least FIG. 5, the customer may use the bar code or QR code at the participating retailer to obtain cash in lieu of locating another ATM. The bar code, QR code, or other visual code may be linked to the customer's financial account at the financial organization.

At operation 516, the bar code or QR code is sent to the customer's smartphone 102. For example, the bar code or QR code can be delivered in various ways, such as through SMS, email, or a mobile application. In one specific example, when the customer is present at the in-network ATM, the bar code or QR code can be delivered via a short-range wireless communication receivable by a mobile device (e.g., smartphone) of the customer. Accordingly, in many examples, issuing a fee modification may include generating a short-range wireless communication. A short-range wireless communication may include various point-to-point communications, such as Near Field Communication.

At operation 518, the financial organization computing device 114 receives a notification of a request for cash by a customer at a participating retailer. In some examples, the request may include, at least, an identification of the financial account of the customer (i.e., the financial account from which the customer wishes to withdraw the cash) and an amount of cash that the customer wishes to withdraw. The participating retailer is one that has an agreement with the financial organization to accept cash requests from a customer having a valid bar code or QR code. For example, the participating retailer may be a coffee shop that has an agreement with the financial organization to accept the cash requests.

At operation 520, the financial organization computing device 114 receives the bar code or QR code from the participating retailer. For example, the retailer can scan the bar code or QR code, and send the bar code or QR code to the financial organization computing device 114. For instance, the smartphone 102 may display the bar code or QR code on a screen thereof. A point of sale (POS) system (or other scanning system) of the retailer may be configured to optically scan the displayed bar code or QR code, and communicate the bar code, QR code, and/or data associated therewith to the financial organization computing device 114 via network 110. In another example, a POS system of the retailer may be configured to receive the bar code or QR code via a wireless communication with the smartphone 102.

At operation 522, the financial organization computing device 114 validates the bar code or QR code. For example, the financial organization computing device 114 may validate the bar code or QR code by referencing information in database 118 using one or more database management system processes. In one example, the bar code or QR code is validated to confirm that the bar code or QR is a genuine bar code or QR code (e.g., a genuine bar code or QR code issued by the financial organization associated with the financial organization computing device 114), and that the bar code or QR code being validated is associated with the correct financial account (i.e., the financial account of the customer attempting to redeem the bar code or QR code).

At operation 524, the financial organization computing device 114 validates that the timestamp and geolocation of the request for cash are within predetermined parameters (e.g., time, date, and/or geographic parameters). For example, as further discussed herein, there may be a requirement that the bar code or QR code be used within a certain date range, time range, and/or distance from an in-network ATM.

At operation 526, the financial organization computing device 114 debits the financial account of the customer for an amount of cash that the retailer provided to the customer.

At operation 528, the financial organization computing device 114 reimburses the retailer to the amount of cash provided to the customer. For example, the financial organization computing device may credit a financial account of the retailer the amount of cash provided to the customer.

Figure 6:
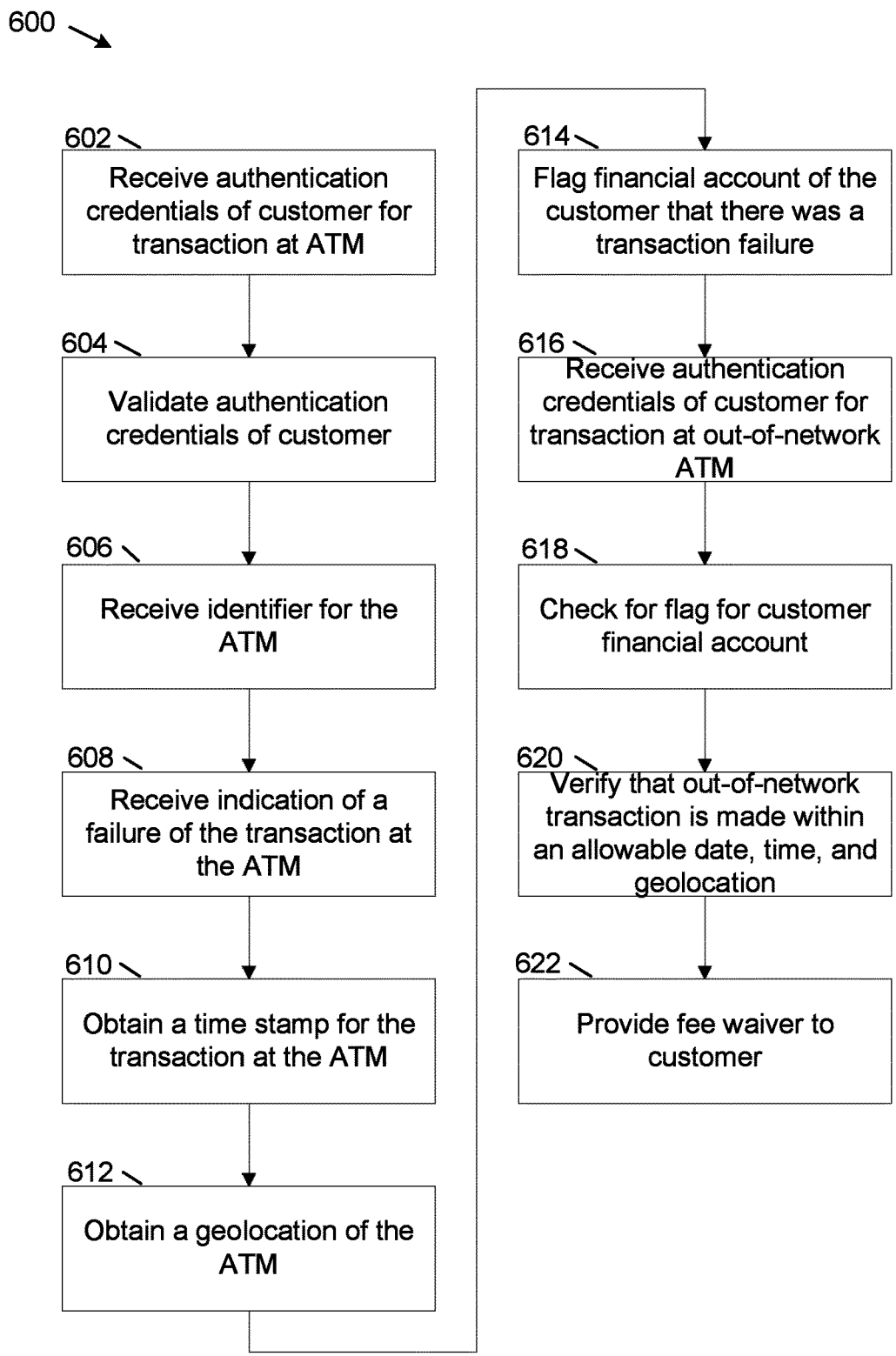
FIG. 6 shows an example method for flagging a customer's financial account for fee modification.

FIG. 6 shows a flowchart of an example method 600 for setting a flag for the customer's account at the financial organization when a failure occurs at the in-network ATM 104. The flag permits indirect fee modification, for which transaction fees associated with a customer transaction at the out-of-network ATM 108 are modified for the customer's financial account.

At operation 602, the financial organization computing device 114 receives authentication credentials for the customer, similar to operation 302 of FIG. 3. The authentication credentials comprise the identifier for the ATM transaction card 106 (e.g. a payment card number (PAN), an account number, a card token, or the like) and the PIN for the ATM transaction card 106. The in-network ATM 104 then transmits the received identifier and PIN to the financial organization computing device 114 for validation.

At operation 604, the financial organization validates the authentication credentials of the customer. Validation comprises verifying that the PIN entered corresponds to PIN previously established by the customer for the ATM transaction card 106. In some arrangements, validation includes verifying the status of the account associated with the ATM transaction card 106. In arrangements where the identifier is packaged as a token received from a mobile wallet, the validation may also include detokenizing the token to obtain the underlying account number.

At operation 606, the financial organization computing device 114 receives an identifier for the in-network ATM 104. The identifier is typically an alphanumeric number (e.g. a serial number, device identifier, etc.) that uniquely identifies the in-network ATM 104, similar to operation 304 of FIG. 3.

At operation 608, the financial organization computing device 114 receives an indication of a failure at the in-network ATM 104. The indication of the failure can be received because of a transaction status message that is sent from the in-network ATM 104. The status message indicates that cause of the failure, such as the in-network ATM 104 being out of cash, a mechanical failure at the in-network ATM 104, or some other cause of the failure.

At operation 610, the financial organization computing device 114 receives a time-stamp for the failure at the in-network ATM 104. The timestamp indicates a date and time of day of the failure. In some implementations, the timestamp is received at the same time as the indication of the failure.

At operation 612, the financial organization computing device 114 obtains a geolocation for the in-network ATM 104. The geolocation can be obtained from a database, for example database 118, by looking up the in-network ATM 104 in the database 118 with the received identifier for the in-network ATM 104.

At operation 614, the financial organization computing device 114 flags the financial account of the customer to indicate that a failure occurred during a customer transaction at the in-network ATM 104. Flagging the financial account of the customer comprises creating some indication on the financial account, such as the setting of metadata like a status indicator, that the failure occurred.

At operation 616, the financial organization computing device 114 receives authentication credentials of the customer for an ATM transaction at the out-of-network ATM 108. For example, a financial organization associated with the out-of-network ATM 108 receives authentication credentials entered by the customer at the out-of-network ATM 108, and sends the authentication credentials to the financial organization computing device 114 for validation. The authentication credentials include the customer's PIN. Validation comprises verifying that the PIN corresponds to a PIN previously established by the customer for the ATM transaction card 106.

In the example implementation for method 600, the out-of-network ATM 108 is identified as an alternate ATM to the in-network ATM 104. For example, the out-of-network ATM 108 may be a nearest alternate ATM to the in-network ATM 104.

At operation 618, after validating the customer's authentication credentials, the financial organization computing device 114 checks the customer's financial account to determine whether the customer's financial account has been flagged for an ATM failure.

At operation 620, when a determination is made that the customer's financial account has been flagged for the ATM failure, the financial organization computing device 114 determines whether the customer ATM transaction at the out-of-network ATM 108 is made within an allowable date, time, and geolocation. The allowable date and time comprises a date and time for the financial transaction at the out-of-network ATM 108 that is within a predetermined date and time, for example one day, of the ATM failure at the in-network ATM 104. The allowable geolocation comprises a geolocation of the out-of-network ATM 108 that is within a predetermined distance, for example 50 miles, of the in-network ATM 104.

At operation 622, when the financial organization computing device 114 verifies that the customer ATM transaction at the out-of-network ATM 108 is made within the allowable date, time, and geolocation, the financial organization computing device 114 provides a fee modification for the customer to any fee charged to the customer at the out-of-network ATM 108. The fee modification comprises crediting the customer's financial account for the fees charged to the customer at the out-of-network ATM 108 by the other financial organization associated with the out-of-network ATM 108 and waiving any out-of-network transaction costs charged by the financial organization. The financial organization computing device 114 also clears the flag for the failure at the customer's financial account.

Figure 7:
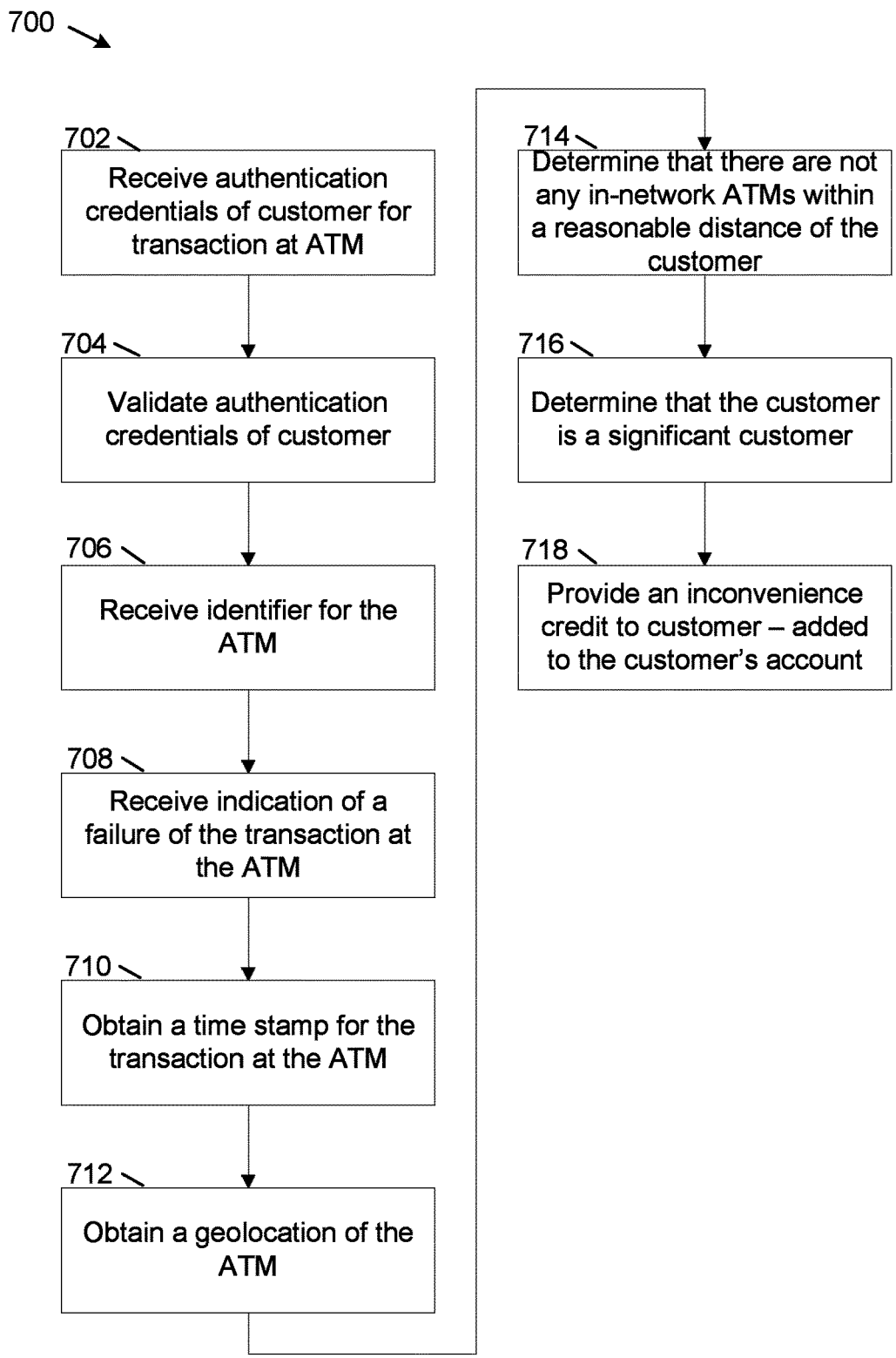
FIG. 7 shows an example method for providing an inconvenience credit for a failure.

FIG. 7 shows a flowchart of an example method 700 for providing fee modification for a customer when a failure occurs at in-network ATM 104 and another in-network ATM is not within a defined geographic location for the customer.

At operation 702, the financial organization computing device 114 receives authentication credentials for the customer, similar to operation 302 of FIG. 3. The authentication credentials comprise the identifier for the ATM transaction card 106 (e.g. a payment card number (PAN), an account number, a card token, or the like) and the PIN for the ATM transaction card 106. The in-network ATM 104 then transmits the received identifier and PIN to the financial organization computing device 114 for validation.

At operation 704, the financial organization validates the authentication credentials of the customer. Validation comprises verifying that the PIN entered corresponds to a PIN previously established by the customer for the ATM transaction card 106. In some arrangements, validation includes verifying the status of the account associated with the ATM transaction card 106. In arrangements where the identifier is packaged as a token received from the mobile wallet, the validation may also include detokenizing the token to obtain the underlying account number.

At operation 706, the financial organization computing device 114 receives an identifier for the in-network ATM 104. The identifier is typically an alphanumeric number (e.g. a serial number, device identifier, etc.) that uniquely identifies the in-network ATM 104, similar to operation 304 of FIG. 3.

At operation 708, the financial organization computing device 114 receives an indication of a failure at the in-network ATM 104. The indication of the failure can be received because of a transaction status message that is sent from the in-network ATM 104. The status message indicates a cause of the failure, such as the in-network ATM 104 being out of cash, a mechanical failure at the in-network ATM 104, or some other cause of the failure.

At operation 710, the financial organization computing device 114 receives a time-stamp for the failure at the in-network ATM 104. The timestamp indicates a date and time of day of the failure. In some implementations, the timestamp is received at the same time at the indication of the failure.

At operation 712, the financial organization computing device 114 obtains a geolocation for the in-network ATM 104. The geolocation can be obtained from a database, for example database 118, by looking up the in-network ATM 104 in the database 118 with the received identifier for the in-network ATM 104.

At operation 714, the financial organization computing device 114 determines that there are not any in-network ATMs within a reasonable geographical distance of the in-network ATM that experienced the failure. For example, a reasonable distance from the in-network ATM can be 2 miles, 5 miles, 10 miles, or the like. In various examples, parameters of a reasonable geographic distance may be a static and predetermined value. For instance, such a value (e.g., feet, yards, miles, meters, kilometers, etc.), may be predetermined by the financial organization, and assigned to an in-network ATM. It is appreciated that each in-network ATM may have a different reasonable geographical distance parameter associated therewith. For instance, in metropolitan areas the parameter may be smaller (e.g., 100 yards) than the parameter associated with in-network ATMs in rural areas (e.g., 2 miles).

In a specific example, the value of the reasonable geographic distance parameter may be based on a customer transaction history, and therefore, automatically determined by the financial organization computing device 114. That is, the financial organization computing device 114 may ascertain, based on a customer's ATM usage history, how likely that customer is to travel to a nearby ATM. Other factors such as time of day, in-network ATM availability, weather, etc. may be used by the financial organization computing device 114 to determine the reasonable geographic distance parameter.

At operation 716, the financial organization can optionally determine that the customer is a significant customer, meaning, that the customer has a significant amount of assets held by the financial organization or otherwise conducts a significant amount of business with the organization. Whether a customer has a significant amount of assets may be ascertained based on a comparison of the customers' assets to one or more asset thresholds. For instance, an asset threshold may be a monetary value, such as an account balance threshold (e.g., $1,000, or $10,000, or $100,000, etc.).

At operation 718, when a determination is made that the customer is a significant customer, a credit can be added to the customer financial account. For example, a credit of $10 can be added to the customer's financial account to compensate the customer for the inconvenience of having to travel more than the reasonable distance to locate an alternative ATM.

Figure 8:
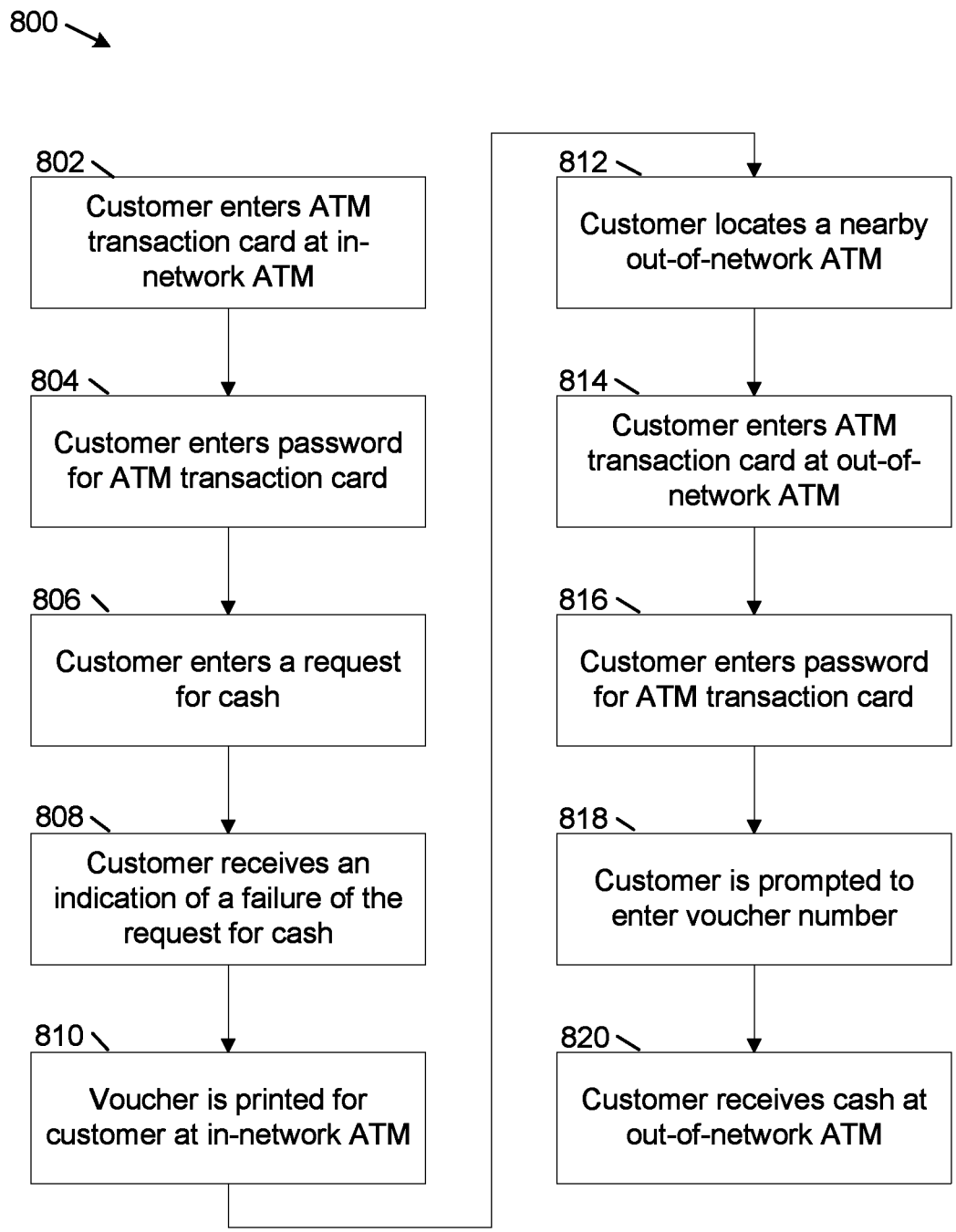
FIG. 8 shows an example method for use of a voucher for fee modification.

FIG. 8 shows a flowchart of an example method for receiving and using a voucher from the perspective of a customer of an in-network ATM. Specifically, FIG. 8 illustrates an example method 800 from the customer's perspective when the in-network ATM has experienced a failure.

At operation 802, the customer enters his/her ATM transaction card at an in-network ATM.

At operation 804, the customer enters the PIN for the ATM transaction card.

At operation 806, the customer enters a request for cash and selects or enters a request for a specific amount cash.

At operation 808, the customer receives an indication of a failure at the in-network ATM transaction for the request for cash. For example, the in-network ATM can display a message indicating that the in-network ATM is out of cash.

At operation 810, the in-network ATM prints a voucher for the customer. The voucher includes a voucher number that can be used for fee modification. The voucher also includes text that indicates a value of the voucher and a description of how the voucher can be used. For example, the text can indicate that the voucher can be used for a fee modification associated with the use of an out-of-network ATM. The text can also include a description including directions to a nearby ATM, which in some examples may be an out-of-network ATM.

In alternative embodiments, the voucher can be delivered electronically. For instance, the voucher can be delivered by text message, push notification, or email. The voucher can also be stored in an electronic wallet. Other configurations are possible.

At operation 812, the customer locates a nearby ATM, which for method 800 is an out-of-network ATM.

At operation 814, the customer enters his/her ATM transaction card into the out-of-network ATM.

At operation 816, the customer enters the PIN for the ATM transaction card.

At operation 818, the customer is prompted to enter a voucher number at the out-of-network ATM. In this case, the financial organization associated with the out-of-network ATM prompts the customer for the voucher number because the customer is using an out-of-network ATM.

At operation 820, when the financial organization associated with the in-network ATM validates the voucher number entered at operation 818, the customer receives the requested cash from the out-of-network ATM.

Figure 9:
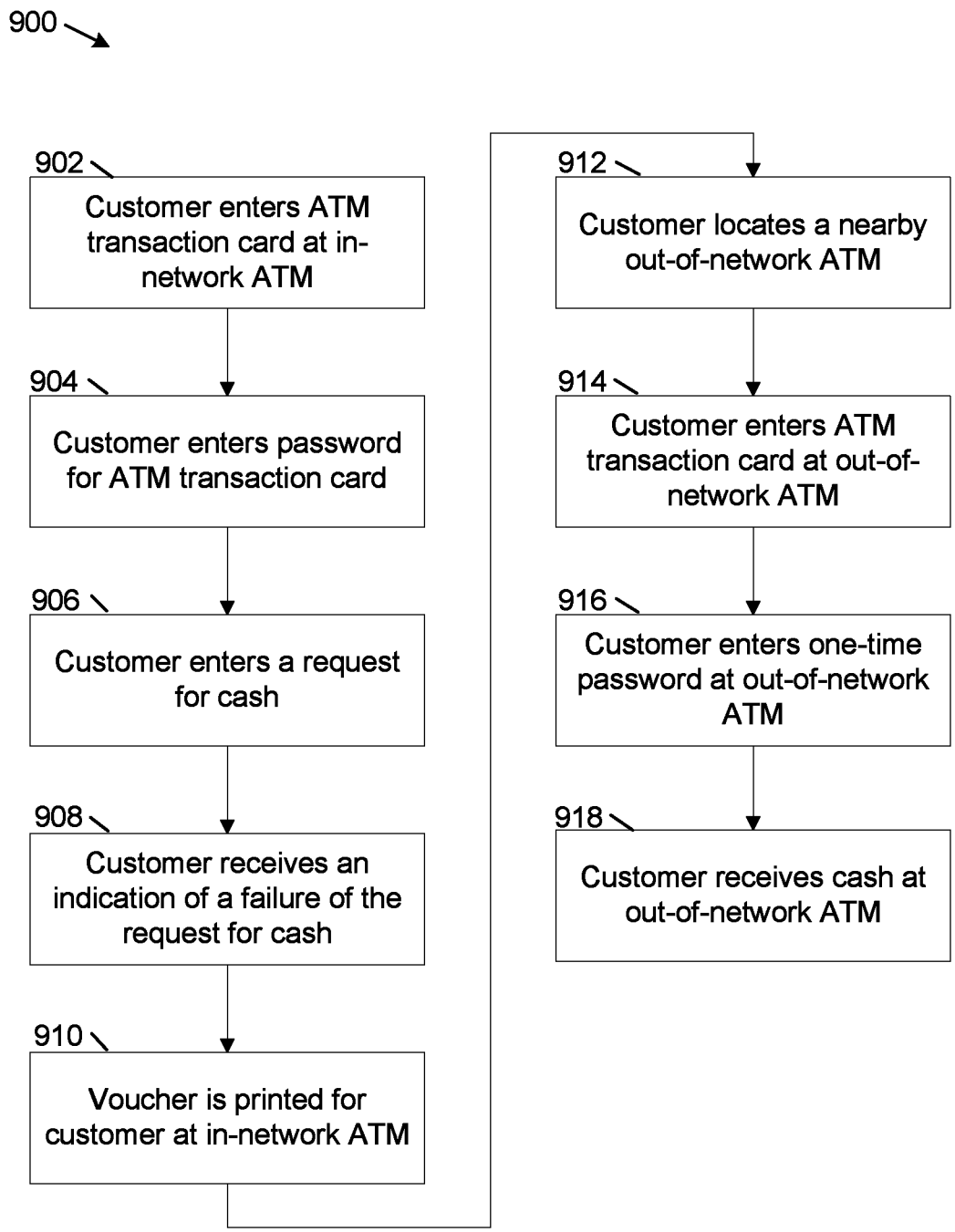
FIG. 9 shows another example method for use of a voucher for fee modification.

FIG. 9 shows a flowchart of another example method for receiving and using a voucher from the perspective of a customer using an in-network ATM. Specifically, FIG. 9 illustrates an example method 900 from the customer's perspective when the in-network ATM has experienced a failure. Method 900 is similar to method 800, except that, as referenced in the method 900, the voucher printed for the customer includes a one-time password (OTP).

At operation 902, the customer enters his/her ATM transaction card at an in-network ATM.

At operation 904, the customer enters the password for the ATM transaction card.

At operation 906, the customer enters a request for cash and selects or enters a request for a specific amount cash.

At operation 908, the customer receives an indication of a failure at the in-network ATM. For example, the in-network ATM can display a message indicating that the in-network ATM is out of cash.

At operation 910, the in-network ATM prints a voucher for the customer. The voucher includes an OTP that can be used at an out-of-network ATM. The voucher also includes text that specifies how the OTP is to be used, for example as a substitute for an ATM transaction card PIN, or to be appended to the ATM transaction card PIN. For method 900, the OTP is to be substituted for the ATM transaction card PIN.

In alternative embodiments, the voucher can be delivered electronically. For instance, the voucher can be delivered by text message, push notification, or email. The voucher can also be stored in an electronic wallet. Other configurations are possible.

At operation 912, the customer locates a nearby ATM, which for method 900 is an out-of-network ATM.

At operation 914, the customer enters his/her ATM transaction card into the out-of-network ATM.

At operation 916, the customer enters the OTP into out-of-network ATM. For example, the OTP may be entered in lieu of the PIN for the customer's ATM transaction card. Or, alternatively, the OTP can be appended to the customer's PIN or otherwise delivered to the out-of-network ATM.

At operation 918, when the financial organization associated with the in-network ATM validates the OTP entered at operation 916, the out-of-network ATM dispenses the amount of the cash requested by the customer at operation 906.

Figure 10:
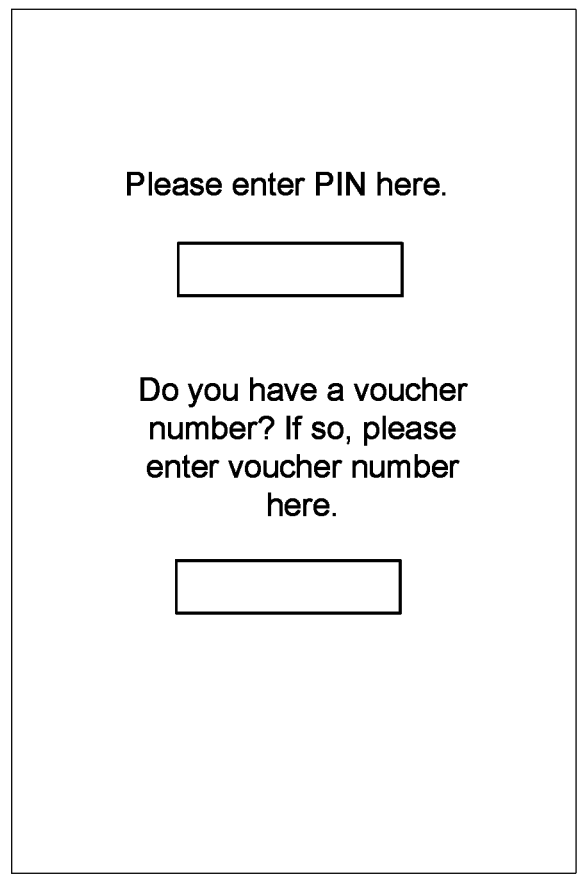
FIG. 10 shows an example graphical user interface that supports fee modification.

FIG. 10 shows an example graphical user interface (GUI) 1000 that may be displayed by an out-of-network ATM, for example, the out-of-network ATM 108 illustrated in FIG. 1. As previously described herein, in various examples the financial organization associated with the out-of-network ATM 108 may have an agreement with the customer's financial organization to perform direct fee modification when an ATM transaction is received from the customer at the out-of-network ATM 108.

The example GUI 1000 is rendered at the out-of-network ATM, when the ATM transaction card is received by the out-of-network ATM. At that time, the out-of-network ATM prompts the customer to enter the PIN associated with the ATM transaction card. In addition, the out-of-network ATM prompts the customer to enter the voucher number. As shown in FIG. 10, the example message "Do you have a voucher number? If so, please enter voucher number here." is displayed on the GUI 1000. Other messages are possible. Upon receipt of the PIN and voucher number, the ATM transaction and possible direct fee modification are performed as described herein.

Figure 11:
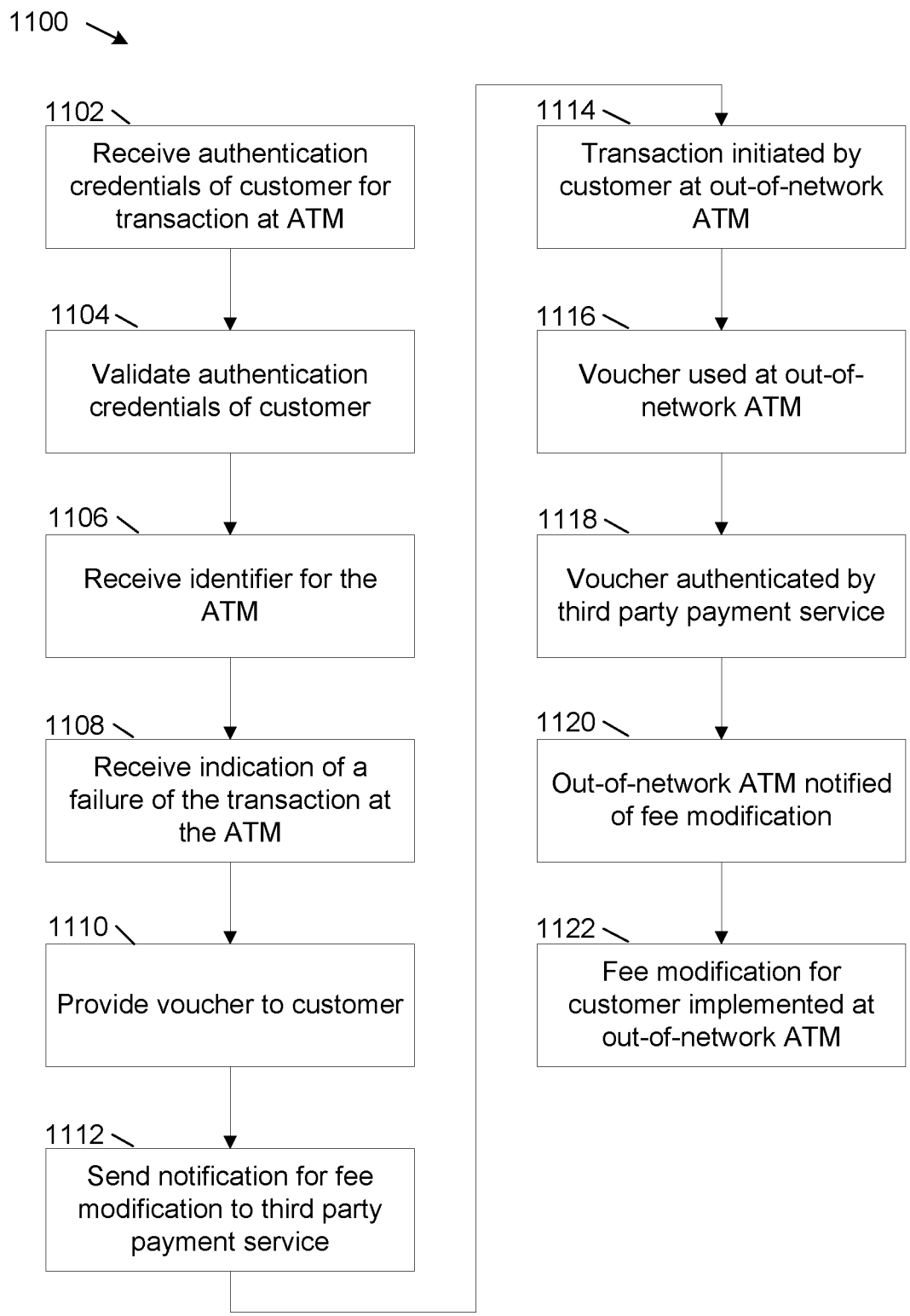
FIG. 11 shows an example method for use of a third party service for fee modification.

FIG. 11 shows a flowchart of an example method 1100 for providing a fee modification using a third party service (e.g., third party service 112 illustrated in FIG. 1), for example Zelle® or Venmo®. For method 1000, the customer has a financial account at the third party service.

At operation 1102, the financial organization computing device 114 receives authentication credentials of a customer of a financial organization associated with the financial organization computing device 114. The authentication credentials are received when at ATM transaction is initiated at in-network ATM 104.

At operation 1104, the financial organization validates the authentication credentials of the customer, as discussed earlier herein. For instance, validation may include verifying that a PIN entered corresponds to PIN previously established by the customer for the ATM transaction card 106. In some arrangements, validation includes verifying the status of the account associated with the ATM transaction card 106. In arrangements where the identifier is packaged as a token received from a mobile wallet, the validation may also include detokenizing the token to obtain the underlying account number.

At operation 1106, the financial organization computing device 114 receives an identifier for the in-network ATM 104, as discussed earlier herein. The identifier is typically an alphanumeric number (e.g. a serial number, device identifier, etc.) that uniquely identifies the in-network ATM 104.

At operation 1108, the financial organization computing device 114 receives an indication of a failure at the in-network ATM 104, as discussed earlier herein. For instance, the indication of the failure can be received because of a transaction status message that is sent from the in-network ATM 104. The status message may indicate the cause of the failure, such as the in-network ATM 104 being out of cash, a mechanical failure at the in-network ATM 104, or some other cause of the failure.

At operation 1110, the financial organization associated with the financial organization computing device 114 provides a voucher to the customer. As discussed earlier herein, the voucher can be a physical voucher or the voucher can be an electronic voucher. The voucher can also include a voucher number, an OTP, or other unique identification.

At operation 1112, the financial organization computing device 114 sends a notification for a fee modification for the customer to the third party service. For instance, such a notification may include information associated with the customer, info associated with the financial account of the customer, and/or information associated with the voucher. For instance, the voucher information may include a voucher ID, a voucher number, and/or one or more parameters associated with the voucher (e.g., time, date, geographic location parameters).

At operation 1114, a transaction is initiated by the customer at the out-of-network ATM.

At operation 1116, the voucher is used at the out-of-network ATM. For method 1100, the out-of-network ATM may prompt the customer for a voucher number, and the customer may enter the voucher or voucher number at the out-of-network ATM.

At operation 1118, the voucher is authenticated by the third party service. For instance, the voucher is authenticated to confirm that the bar code or QR is a genuine voucher (e.g., a genuine voucher issued by the financial organization associated with the financial organization computing device 114). In some examples, this may include comparing one or more attributes of the voucher, such as a voucher ID, a voucher number, and or other information associated with a voucher (e.g., parameters associated with time, date, and geographic location) to known information. In some other examples, authentication services may also include operations for authenticating information descriptive of the in-network ATM that issued the voucher (e.g., the identifier for the in-network ATM 104). Various authentication techniques may be used, and may be tailored to the specific authentication practices and protocols of the financial organization associated with the in-network ATM that issued the voucher.

For method 1100, the third party service is known to the financial organization associated with the out-of-network ATM. In other implementations, the third payment service can be identified by information on the voucher, for example by a predetermined number of digits within the voucher number (e.g., the first four digits of the voucher number).

At operation 1120, the financial organization associated with the out-of-network ATM authorizes the fee modification for the customer and notifies the out-of-network ATM of the fee modification.

At operation 1122, the out-of-network ATM implements the fee modification for the customer, waiving any transaction fees associated with the ATM transaction at the out-of-network ATM.

Figure 12:
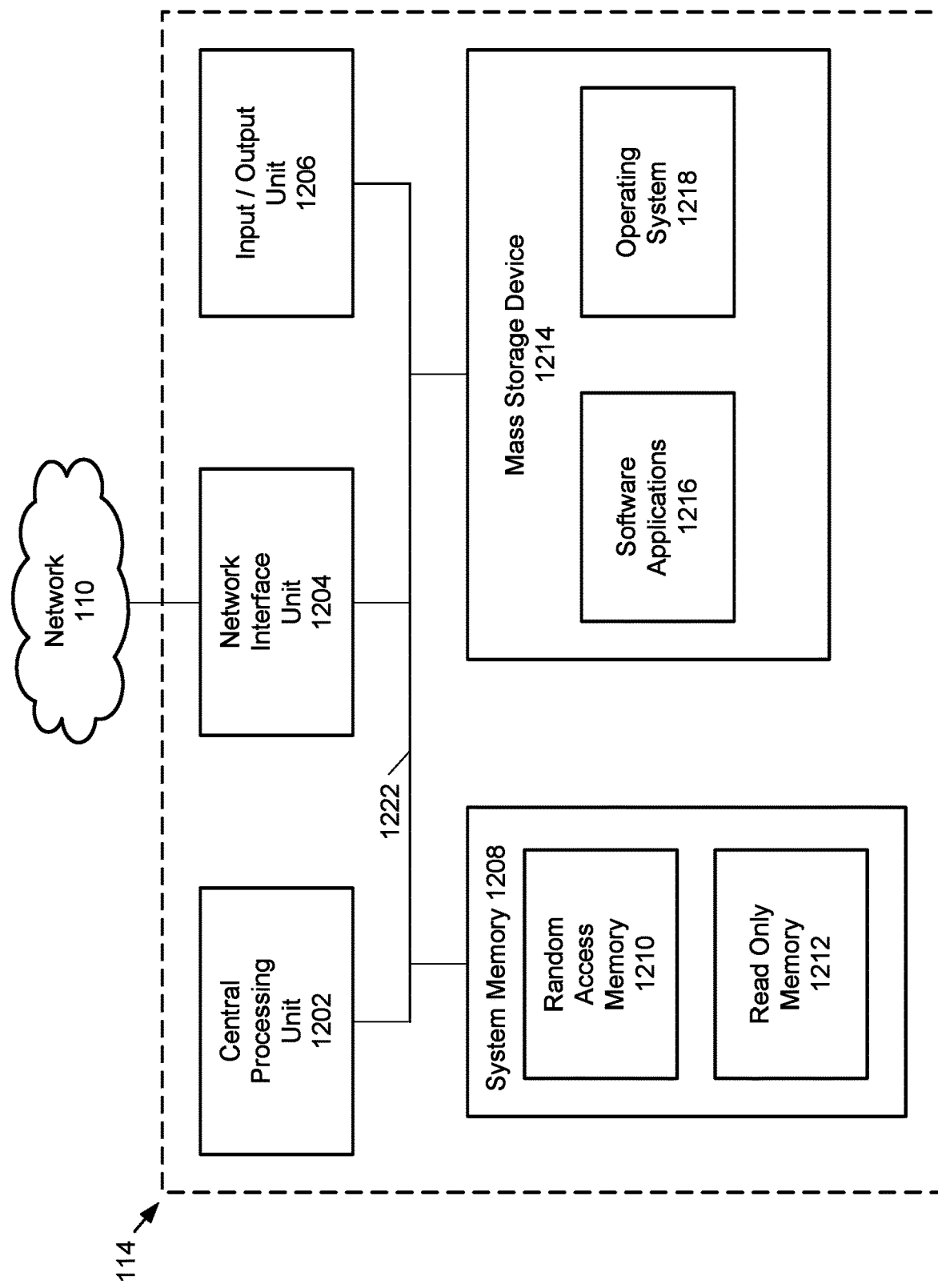
FIG. 12 shows example physical components of the financial organization computing device of FIG. 1.

As illustrated in the example of FIG. 12, financial organization computing device 114 (including the ATM processing engine 116) includes at least one central processing unit ("CPU") 1202, also referred to as a processor, a system memory 1208, and a system bus 1222 that couples the system memory 1208 to the CPU 1202. The system memory 1208 includes a random access memory ("RAM") 1210 and a read-only memory ("ROM") 1212. A basic input/output system that contains the basic routines that help to transfer information between elements within the financial organization computing device 114, such as during startup, is stored in the ROM 1212. The financial organization computing device 114 further includes a mass storage device 1214. The mass storage device 1214 is able to store software instructions and data. Some or all of the components of the financial organization computing device 114 can also be included in the smartphone 102.

The mass storage device 1214 is connected to the CPU 1202 through a mass storage controller (not shown) connected to the system bus 1222. The mass storage device 1214 and its associated computing device-readable data storage media provide non-volatile, non-transitory storage for the financial organization computing device 114. Although the description of computing device-readable data storage media contained herein refers to a mass storage device, such as a hard disk or solid state disk, it should be appreciated by those skilled in the art that computing device-readable data storage media can be any available non-transitory, physical device or article of manufacture from which the central display station can read data and/or instructions.

Computing device-readable data storage media include volatile and non-volatile, removable and non-removable media implemented in any method or technology for storage of information such as computing device-readable software instructions, data structures, program modules or other data. Example types of computing device-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial organization computing device 114.

According to various embodiments of the invention, the financial organization computing device 114 may operate in a networked environment using logical connections to remote network devices through the network 110, such as the Internet, or another type of network. The financial organization computing device 114 may connect to the network 110 through a network interface unit 1204 connected to the system bus 1222. It should be appreciated that the network interface unit 1204 may also be utilized to connect to other types of networks and remote computing systems. The financial organization computing device 114 also includes an input/output controller 1206 for receiving and processing input from a number of other devices, including a touch user interface display screen, or another type of input device. Similarly, the input/output controller 1206 may provide output to a touch user interface display screen or other type of output device.

As mentioned briefly above, the mass storage device 1214 and the RAM 1210 of the financial organization computing device 114 can store software instructions and data. The software instructions include an operating system 1218 suitable for controlling the operation of the financial organization computing device 114. The mass storage device 1214 and/or the RAM 1210 also store software instructions and software applications 1216, that when executed by the CPU 1202, cause the financial organization computing device 114 to provide the functionality of the financial organization computing device 114 discussed in this document. For example, the mass storage device 1214 and/or the RAM 1210 can store software instructions that, when executed by the CPU 1202, cause the financial organization computing device 114 to display received data on the display screen of the financial organization computing device 114.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device of a first financial organization, the method comprising:
   receiving, by the electronic computing device of the first financial organization, a request for a first automated teller machine (ATM) transaction from an in-network ATM;
   receiving, by the electronic computing device of the first financial organization, authentication credentials of a customer of the in-network ATM, wherein the authentication credentials are associated with the request for the first ATM transaction, and wherein the authentication credentials include an identifier from transient data of an ATM transaction card;
   receiving, by the electronic computing device of the first financial organization, a notification of a failure to execute the first ATM transaction at the in-network ATM in a transaction status message from the in-network ATM; and
   issuing, by the electronic computing device of the first financial organization in response to the authentication credentials and the transaction status message, a voucher number having a unique numeric or alphanumeric string;
   writing, by the in-network ATM, transient data including the voucher number on the ATM transaction card used during the first ATM transaction, the transient data permitting a fee modification when the ATM transaction card is received at an out-of-network ATM;
   in response to receiving the notification of the failure and the voucher number from the transient data on the ATM transaction card, issuing, by the electronic computing device of the first financial organization, the fee modification to the customer of the in-network ATM, wherein the fee modification permits modification of a transaction fee associated with a subsequent ATM transaction at the out-of-network ATM;
   receiving, by a computer of a second financial organization, a request for the subsequent ATM transaction at the out-of-network ATM;
   receiving and validating, by the computer of the second financial organization communicating with the electronic computing device of the first financial organization, the authentication credentials of the customer at the out-of-network ATM;
   obtaining a timestamp for the subsequent ATM transaction at the out-of-network ATM;
   obtaining a geolocation for the out-of-network ATM;
   when the timestamp for the subsequent ATM transaction at the out-of-network ATM is within a pre-determined date and time range, and when the geolocation for the out-of-network ATM is within a predetermined distance of a location of the in-network ATM, modifying, by the electronic computing device of the first financial organization, the transaction fee.

2. The method of claim 1, wherein issuing the fee modification comprises printing a voucher at the in-network ATM, the voucher including the voucher number.

3. The method of claim 1, wherein issuing the fee modification includes generating a short-range wireless communication receivable by a mobile device of the customer.

4. The method of claim 1, further comprising, responsive to receiving the notification of the failure, flagging a financial account associated with the customer for the fee modification.

5. The method of claim 1, wherein the fee modification permits the transaction fee to be modified at the out-of-network ATM subsequent to the subsequent ATM transaction at the out-of-network ATM.

6. The method of claim 1, wherein the fee modification at least partially reimburses a monetary fee assessed to a financial account of the customer for use of the out-of-network ATM.

7. The method of claim 1, wherein the fee modification at least partially cancels a monetary fee assessed to a financial account of the customer for use of the out-of-network ATM.

8. The method of claim 1, wherein the failure to execute the ATM transaction is based upon a detected insufficiency in an ATM cash supply or a mechanical failure at the ATM.

9. The method of claim 1, further comprising flagging a financial account associated with the customer for the fee modification.

* * * * *

UNITED STATES PATENT AND TRADEMARK OFFICE
CERTIFICATE OF CORRECTION

| | | |
|---|---|---|
| PATENT NO. | : 11,704,687 B1 | Page 1 of 1 |
| APPLICATION NO. | : 16/740588 | |
| DATED | : July 18, 2023 | |
| INVENTOR(S) | : De Frank et al. | |

It is certified that error appears in the above-identified patent and that said Letters Patent is hereby corrected as shown below:

On the Title Page

Page 2, Column 1, Line 19: In item (56) Other Publications, delete "Novembers," and insert --November 5,--

Page 2, Column 2, Line 9: In item (56) Other Publications, delete "aboud" and insert --about--

In the Specification

Column 21, Line 48: delete "and or" and insert --and/or--

In the Claims

Column 24, Line 17: In Claim 1, after "ATM;" insert --and--

Signed and Sealed this
Third Day of October, 2023

Katherine Kelly Vidal
*Director of the United States Patent and Trademark Office*